United States Patent
Rosewarne

(10) Patent No.: US 12,501,075 B2
(45) Date of Patent: Dec. 16, 2025

(54) METHOD, APPARATUS AND SYSTEM FOR ENCODING AND DECODING A BLOCK OF VIDEO SAMPLES USING CONSTRAINTS IN A GENERAL CONSTRAINT'S INFORMATION SYNTAX TO CONTROL A SYNTAX IN SEQUENCE PARAMETER SET

(71) Applicant: CANON KABUSHIKI KAISHA, Tokyo (JP)

(72) Inventor: Christopher James Rosewarne, Concord (AU)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 17/925,773

(22) PCT Filed: Apr. 16, 2021

(86) PCT No.: PCT/AU2021/050339
§ 371 (c)(1),
(2) Date: Nov. 16, 2022

(87) PCT Pub. No.: WO2021/232088
PCT Pub. Date: Nov. 25, 2021

(65) Prior Publication Data
US 2023/0171432 A1 Jun. 1, 2023

(30) Foreign Application Priority Data
May 21, 2020 (AU) ................. 2020203330

(51) Int. Cl.
*H04N 11/02* (2006.01)
*H04N 19/176* (2014.01)
(Continued)

(52) U.S. Cl.
CPC .......... *H04N 19/70* (2014.11); *H04N 19/176* (2014.11); *H04N 19/46* (2014.11)

(58) Field of Classification Search
CPC ...................................... H04N 19/70
(Continued)

(56) References Cited

U.S. PATENT DOCUMENTS 10,542,294 B2    1/2020   Huang et al.
11,575,943 B2 *  2/2023   Kim ............... H04N 19/70
(Continued)

FOREIGN PATENT DOCUMENTS

AU    2020203330 A1    12/2021
CN    105900424 A      8/2016
(Continued)

OTHER PUBLICATIONS

Yong He, et al., AHG9: A summary of proposals on general constraints information (GCI), Joint Video Experts Team (JVET) of ITU-T SG 16 WP 3 and ISO/IEC JTC 1/SC 29/WG 11, 19th Meeting: by teleconference, Jun. 22-Jul. 1, 2020, Doc. No. JVET-S0138-v5, XP030288291.
(Continued)

*Primary Examiner* — Leron Beck
(74) *Attorney, Agent, or Firm* — Canon U.S.A., Inc. IP Division

(57) ABSTRACT

Decoding an image frame from a bitstream, the image frame being divided into a plurality of coding tree units. The method comprises decoding a maximum transform block size constraint and or a maximum coding tree unit (CTU) size constraint from the bitstream; and decoding a maximum enabled transform block size and/or a maximum enabled CTU size from the bitstream. The decoded maximum enabled transform block size is less than or equal to the decoded maximum transform block size constraint. The decoded maximum enabled CTU size is less than or equal to the decoded maximum CTU size constraint. Determining each of the one or more transform blocks for each of the
(Continued)

plurality of coding tree units according to the decoded maximum enabled transform block size, maximum enabled CTU and split flags decoded from the bitstream; and decode each of the determined one or more transform blocks from the bitstream.

7 Claims, 12 Drawing Sheets

(51) Int. Cl.
  *H04N 19/46* (2014.01)
  *H04N 19/70* (2014.01)
(58) Field of Classification Search
  USPC ...................................... 375/240.01–240.29
  See application file for complete search history.

(56) References Cited

U.S. PATENT DOCUMENTS

| | | | |
|---|---|---|---|
| 12,034,950 B2* | 7/2024 | Zhang | H04N 19/44 |
| 2014/0079116 A1* | 3/2014 | Wang | H04N 21/816 |
| | | | 375/240.02 |
| 2014/0314149 A1 | 10/2014 | Cheon et al. | |
| 2014/0321529 A1 | 10/2014 | Jung et al. | |
| 2015/0326881 A1* | 11/2015 | Ikai | H04N 19/176 |
| | | | 375/240.12 |
| 2019/0110050 A1 | 4/2019 | Tsai | |
| 2019/0379890 A1 | 12/2019 | Tsai et al. | |
| 2021/0076074 A1* | 3/2021 | Chang | H04N 19/96 |
| 2021/0092401 A1* | 3/2021 | Du | H04N 19/186 |
| 2022/0182641 A1* | 6/2022 | Nam | H04N 19/176 |
| 2022/0321883 A1* | 10/2022 | Poirier | H04N 19/119 |
| 2022/0337881 A1* | 10/2022 | Ma | H04N 19/117 |
| 2022/0377353 A1* | 11/2022 | Zhang | H04N 19/176 |
| 2023/0021488 A1* | 1/2023 | Deng | H04N 19/186 |
| 2023/0027478 A1* | 1/2023 | Deng | H04N 19/117 |

FOREIGN PATENT DOCUMENTS

| | | | | |
|---|---|---|---|---|
| CN | 111050171 A | | 4/2020 | |
| EP | 3032829 B1 | | 3/2020 | |
| WO | 2015/052898 A1 | | 4/2015 | |
| WO | 2019/069950 A1 | | 4/2019 | |
| WO | 2020/180769 A1 | | 9/2020 | |
| WO | 2021006630 A1 | | 1/2021 | |
| WO | 2021/058380 A1 | | 4/2021 | |
| WO | WO-2021208899 A1 * | 10/2021 | ........... H04N 19/119 |
| WO | 2021233709 A1 | | 11/2021 | |

OTHER PUBLICATIONS

Rosewarne, C., et al., AHG9: On constraint flags, Joint Video Experts Team (JVET) of ITU-T SG 16 WP 3 and ISO/IEC JTC 1/SC 29/WG 11, 19th Meeting: by teleconference, Jun. 22-Jul. 1, 2020, Doc. No. JVET-S0066, XP030289658.

Chen, Jianle, et al., Algorithm description for Versatile Video Coding and Test Model 8, Joint Video Experts Team (JVET) of ITU-T SG 16 WP 3 and ISO/IEC JTC 1/SC 29/WG 11, 17th Meeting, Brussels, BE, Jan. 7-17, 2020, Doc. No. Q2002-v1, XP030287933.

Bross, Benjamin, et al., Versatile Video Coding (Draft 9), Joint Video Experts Team (JVET) of ITU-T SG 16 WP 3 and ISO/IEC JTC 1/SC 29/WG 11, 18th Meeting: by teleconference, Apr. 15-24, 2020, Doc. No. JVET-R2001-v7, XP030224291.

* cited by examiner

METHOD, APPARATUS AND SYSTEM FOR ENCODING AND DECODING A BLOCK OF VIDEO SAMPLES USING CONSTRAINTS IN A GENERAL CONSTRAINT'S INFORMATION SYNTAX TO CONTROL A SYNTAX IN SEQUENCE PARAMETER SET

REFERENCE TO RELATED APPLICATION(S)

This application is the National Phase application of PCT Application No. PCT/AU2021/050339 filed on Apr. 16, 2021 and titled "METHOD, APPARATUS AND SYSTEM FOR ENCODING A BLOCK OF VIDEO SAMPLES". This application claims the benefit under 35 U.S.C. § 119 of the filing date of Australian Patent Application No. 2020203330, filed May 21, 2020. Each of the above-cited applications is hereby incorporated by reference in its entirety as if fully set forth herein.

TECHNICAL FIELD

The present invention relates generally to digital video signal processing and, in particular, to a method, apparatus and system for encoding and decoding a block of video samples. The present invention also relates to a computer program product including a computer readable medium having recorded thereon a computer program for encoding and decoding a block of video samples.

BACKGROUND

Many applications for video coding currently exist, including applications for transmission and storage of video data. Many video coding standards have also been developed and others are currently in development. Recent developments in video coding standardisation have led to the formation of a group called the "Joint Video Experts Team" (JVET). The Joint Video Experts Team (JVET) includes members of two Standards Setting Organisations (SSOs), namely: Study Group 16, Question 6 (SG16/Q6) of the Telecommunication Standardisation Sector (ITU-T) of the International Telecommunication Union (ITU), also known as the "Video Coding Experts Group" (VCEG) and the International Organisation for Standardisation/International Electrotechnical Commission Joint Technical Committee 1/Subcommittee 29/Working Group 11 (ISO/IEC JTC1/SC29/WG11), also known as the "Moving Picture Experts Group" (MPEG).

The Joint Video Experts Team (JVET) issued a Call for Proposals (CfP), with responses analysed at its $10^{th}$ meeting in San Diego, USA. The submitted responses demonstrated video compression capability significantly outperforming that of the current state-of-the-art video compression standard, i.e.: "high efficiency video coding" (HEVC). On the basis of this outperformance it was decided to commence a project to develop a new video compression standard, to be named 'versatile video coding' (VVC). VVC is anticipated to address ongoing demand for ever-higher compression performance, especially as video formats increase in capability (e.g., with higher resolution and higher frame rate) and address increasing market demand for service delivery over WANs, where bandwidth costs are relatively high. VVC must be implementable in contemporary silicon processes and offer an acceptable trade-off between the achieved performance versus the implementation cost. The implementation cost can be considered for example, in terms of one or more of silicon area, CPU processor load, memory utilisation and bandwidth. Part of the versatility of the VVC standard is in the wide selection of tools available for compressing video data, as well as the wide range of applications for which VVC is suitable.

Video data includes a sequence of frames of image data, each frame including one or more colour channels. Generally, one primary colour channel and two secondary colour channels are needed. The primary colour channel is generally referred to as the 'luma' channel and the secondary colour channel(s) are generally referred to as the 'chroma' channels. Although video data is typically displayed in an RGB (red-green-blue) colour space, this colour space has a high degree of correlation between the three respective components. The video data representation seen by an encoder or a decoder is often using a colour space such as YCbCr. YCbCr concentrates luminance, mapped to 'luma' according to a transfer function, in a Y (primary) channel and chroma in Cb and Cr (secondary) channels. Due to the use of a decorrelated YCbCr signal, the statistics of the luma channel differ markedly from those of the chroma channels. A primary difference is that after quantisation, the chroma channels contain relatively few significant coefficients for a given block compared to the coefficients for a corresponding luma channel block. Moreover, the Cb and Cr channels may be sampled spatially at a lower rate (subsampled) compared to the luma channel, for example half horizontally and half vertically—known as a '4:2:0 chroma format'. The 4:2:0 chroma format is commonly used in 'consumer' applications, such as internet video streaming, broadcast television, and storage on Blu-Ray™ disks. Subsampling the Cb and Cr channels at half-rate horizontally and not subsampling vertically is known as a '4:2:2 chroma format'. The 4:2:2 chroma format is typically used in professional applications, including capture of footage for cinematic production and the like. The higher sampling rate of the 4:2:2 chroma format makes the resulting video more resilient to editing operations such as colour grading. Prior to distribution to consumers, 4:2:2 chroma format material is often converted to the 4:2:0 chroma format and then encoded for distribution to consumers. In addition to chroma format, video is also characterised by resolution and frame rate. Example resolutions are ultra-high definition (UHD) with a resolution of 3840×2160 or '8K' with a resolution of 7680×4320 and example frame rates are 60 or 120 Hz. Luma sample rates may range from approximately 500 mega samples per second to several giga samples per second. For the 4:2:0 chroma format, the sample rate of each chroma channel is one quarter the luma sample rate and for the 4:2:2 chroma format, the sample rate of each chroma channel is one half the luma sample rate.

The VVC standard is a 'block based' codec, in which frames are firstly divided into a square array of regions known as 'coding tree units' (CTUs). CTUs generally occupy a relatively large area, such as 128×128 luma samples. However, CTUs at the right and bottom edge of each frame may be smaller in area. Associated with each CTU is a 'coding tree' either for both the luma channel and the chroma channels (a 'shared tree') or a separate tree each for the luma channel and the chroma channels. A coding tree defines a decomposition of the area of the CTU into a set of blocks, also referred to as 'coding blocks' (CBs). When a shared tree is in use a single coding tree specifies blocks both for the luma channel and the chroma channels, in which case the collections of collocated coding blocks are referred to as 'coding units' (CUs), i.e., each CU having a coding block for each colour channel. The CBs are processed for encoding or decoding in a particular order. As a consequence of the use of the 4:2:0 chroma format, a CTU with a luma coding tree for a 128×128 luma sample area has a corresponding chroma coding tree for a 64×64 chroma sample area, collocated with the 128×128 luma sample area. When a single coding tree is in use for the luma channel and the chroma channels, the collections of collocated blocks for a given area are generally referred to as 'units', for example the above-mentioned CUs, as well as 'prediction units' (PUs), and 'transform units' (TUs). A single tree with CUs spanning the colour channels of 4:2:0 chroma format video data result in chroma blocks half the width and height of the corresponding luma blocks. When separate coding trees are used for a given area, the above-mentioned CBs, as well as 'prediction blocks' (PBs), and 'transform blocks' (TBs) are used.

Notwithstanding the above distinction between 'units' and 'blocks', the term 'block' may be used as a general term for areas or regions of a frame for which operations are applied to all colour channels.

For each CU a prediction unit (PU) of the contents (sample values) of the corresponding area of frame data is generated (a 'prediction unit'). Further, a representation of the difference (or 'spatial domain' residual) between the prediction and the contents of the area as seen at input to the encoder is formed. The difference in each colour channel may be transformed and coded as a sequence of residual coefficients, forming one or more TUs for a given CU. The applied transform may be a Discrete Cosine Transform (DCT) or other transform, applied to each block of residual values. This transform is applied separably, i.e. that is the two-dimensional transform is performed in two passes. The block is firstly transformed by applying a one-dimensional transform to each row of samples in the block. Then, the partial result is transformed by applying a one-dimensional transform to each column of the partial result to produce a final block of transform coefficients that substantially decorrelates the residual samples. Transforms of various sizes are supported by the VVC standard, including transforms of rectangular-shaped blocks, with each side dimension being a power of two. Transform coefficients are quantised for entropy encoding into a bitstream.

VVC features intra-frame prediction and inter-frame prediction. Intra-frame prediction involves the use of previously processed samples in a frame being used to generate a prediction of a current block of samples in the frame. Inter-frame prediction involves generating a prediction of a current block of samples in a frame using a block of samples obtained from a previously decoded frame. The block of samples obtained from a previously decoded frame is offset from the spatial location of the current block according to a motion vector, which often has filtering being applied. Intra-frame prediction blocks can be (i) a uniform sample value ("DC intra prediction"), (ii) a plane having an offset and horizontal and vertical gradient ("planar intra prediction"), (iii) a population of the block with neighbouring samples applied in a particular direction ("angular intra prediction") or (iv) the result of a matrix multiplication using neighbouring samples and selected matrix coefficients. Further discrepancy between a predicted block and the corresponding input samples may be corrected to an extent by encoding a 'residual' into the bitstream. The residual is generally transformed from the spatial domain to the frequency domain to form residual coefficients (in a 'primary transform domain'), which may be further transformed by application of a 'secondary transform' (to produce residual coefficients in a 'secondary transform domain'). Residual coefficients are quantised according to a quantisation parameter, resulting in a loss of accuracy of the reconstruction of the samples produced at the decoder but with a reduction in bitrate in the bitstream.

An intra-block copy (IBC) mode allows production a prediction of a block using a block of samples from the same frame. An alternative 'matrix intra prediction' (MIP) mode is available, whereby a prediction block is produced using a matrix multiplication of a predetermined vector and the block neighbouring samples. A block may be palette coded instead of using a transform. The three colour channels of a block may be passed through an adaptive colour transform (ACT), generally decorrelating RGB colour space into YCbCr colour space. The Cb and Cr channel residuals may be jointly coded (JCbCr). A selection of primary transforms (MTS) is available, including DCT-2, DCT-8, and DST-7, and a transform skip (TS) mode. An optional secondary transform is also available, whereby one kernel out of a set of kernels is selected based on intra prediction mode and block size and applicable to the low-frequency region of the transform block, known as low-frequency non-separable transform (LFNST). The residual may be quantised and coded with a trellis scheme, known as 'dependent quantisation' (DQ). Inter-predicted blocks may be predicted as a set of sub-blocks, each with a different motion vector derived according to an affine motion model. A block may be produced using a combined (uniform) blended intra prediction operation and inter prediction operation. A block may also be produced using a geometrically oriented blend of two different inter predicted blocks (CIIP). A luma mapping with chroma scaling (LMCS) process may be applied as part of the decoding process, mapping luma samples to particular values and may apply a scaling operation to the values of chroma samples. An adaptive loop filter (ALF) may be applied whereby luma and chroma samples are spatially filtered using one of multiple filters sent in the bitstream, mainly for smoothing purposes. Dequantisation of residual coefficients for a transform block may be performed in a non-uniform manner, according to a (spatial) scaling matrix (or 'scaling list') applied in combination with the quantisation parameter for the transform block.

SUMMARY

It is an object of the present invention to substantially overcome, or at least ameliorate, one or more disadvantages of existing arrangements.

One aspect of the present disclosure provides a method of decoding an image frame from a bitstream, the image frame being divided into a plurality of coding tree units, each of the coding tree units being divided into one or more transform blocks, the method comprising: decoding a maximum transform block size constraint from the bitstream; decoding a maximum enabled transform block size from the bitstream, the decoded maximum enabled transform block size being less than or equal to the decoded maximum transform block size constraint; determining the one or more transform blocks for each of the plurality of coding tree units according to the decoded maximum enabled transform block size and split flags decoded from the bitstream; and decoding each of the determined one or more transform blocks from the bitstream to decode the image frame.

According to another aspect, the maximum transform block size constraint uses a fixed-length codeword of 1 bit.

According to another aspect, the maximum enabled transform block size constraint is decoded from a general_constraint_info syntax structure in the bitstream.

According to another aspect, the maximum transform block size constraint is decoded from one of a video parameter set and a sequence parameter set of the bitstream.

According to another aspect, the maximum enabled transform block size uses a fixed-length codeword of 1 bit.

According to another aspect, the maximum enabled transform block size is decoded from a seq_parameter_set_rbsp( ) syntax structure in the bitstream.

Another aspect of the present disclosure provides a method of decoding an image frame from a bitstream, the image frame being divided into a plurality of coding tree units, each of the coding tree units being divided into one or more coding units, the method comprising: decoding a maximum coding tree unit size constraint from the bitstream; decoding a maximum enabled coding tree unit size from the bitstream, the decoded maximum enabled coding tree unit size being less than or equal to the decoded maximum coding unit size constraint; determining the one or more coding units for each of the plurality of coding tree units according to the decoded maximum enabled coding tree size and split flags decoded from the bitstream; and decoding each of the determined one or more coding units from the bitstream to decode the image frame.

According to another aspect, the maximum coding tree unit size constraint uses a fixed-length codeword of 1 bit.

According to another aspect, the maximum enabled coding tree unit size constraint is decoded from a general_constraint_info syntax structure in the bitstream.

According to another aspect, the maximum coding tree unit size constraint is decoded from one of a video parameter set and a sequence parameter set of the bitstream.

According to another aspect, the maximum enabled coding tree unit size uses a fixed-length codeword of 1 bit.

According to another aspect, the maximum enabled coding tree unit size is decoded from a seq_parameter_set_rbsp( ) syntax structure in the bitstream.

Another aspect of the present disclosure provides a non-transitory computer-readable medium having a computer program stored thereon to implement a method of decoding an image frame from a bitstream, the image frame being divided into a plurality of coding tree units, each of the coding tree units being divided into one or more transform blocks, the method comprising: decoding a maximum transform block size constraint from the bitstream; decoding a maximum enabled transform block size from the bitstream, the decoded maximum enabled transform block size being less than or equal to the decoded maximum transform block size constraint; determining the one or more transform blocks for each of the plurality of coding tree units according to the decoded maximum enabled transform block size and split flags decoded from the bitstream; and decoding each of the determined one or more transform blocks from the bitstream to decode the image frame.

Another aspect of the present disclosure provides a video decoder configured to implement a method of decoding an image frame from a bitstream, the image frame being divided into a plurality of coding tree units, each of the coding tree units being divided into one or more coding units, the method comprising: decoding a maximum coding tree unit size constraint from the bitstream; decoding a maximum enabled coding tree unit size from the bitstream, the decoded maximum enabled coding tree unit size being less than or equal to the decoded maximum coding unit size constraint; determining the one or more coding units for each of the plurality of coding tree units according to the decoded maximum enabled coding tree size and split flags decoded from the bitstream; and decoding each of the determined one or more coding units from the bitstream to decode the image frame.

Another aspect of the present disclosure provides a system, comprising: a memory; and a processor, wherein the processor is configured to execute code stored on the memory for implementing a method of decoding an image frame from a bitstream, the image frame being divided into a plurality of coding tree units, each of the coding tree units being divided into one or more transform blocks, the method comprising: decoding a maximum transform block size constraint from the bitstream; decoding a maximum enabled transform block size from the bitstream, the decoded maximum enabled transform block size being less than or equal to the decoded maximum transform block size constraint; determining the one or more transform blocks for each of the plurality of coding tree units according to the decoded maximum enabled transform block size and split flags decoded from the bitstream; and decoding each of the determined one or more transform blocks from the bitstream to decode the image frame.

Another aspect of the present disclosure provides a method of decoding an image frame from a bitstream, the image frame being divided into a plurality of coding tree units, each of the coding tree units being divided into one or more coding blocks, the method comprising: decoding, from the bitstream, a first flag which indicates constraint on use of a scaling list, the flag being included in general constraints information syntax; decoding, from the bitstream, a second flag indicates enablement of the scaling list, the second flag being constrained by the first flag; decoding the one or more coding blocks from the bitstream with scaling performed according to a value of the second flag; and decoding the image frame using the decoded one or more coding units.

Another aspect of the present disclosure provides a video decoding apparatus for decoding an image frame from a bitstream, the image frame being divided into a plurality of coding tree units, each of the coding tree units being divided into one or more transform blocks, the video decoding apparatus comprising: a first decoding unit configured to decode a maximum transform block size constraint from the bitstream; a second decoding unit configured to decode a maximum enabled transform block size from the bitstream, the decoded maximum enabled transform block size being less than or equal to the decoded maximum transform block size constraint; a determining unit configured to determine the one or more transform blocks for each of the plurality of coding tree units according to the decoded maximum enabled transform block size and split flags decoded from the bitstream; and a third decoding unit configured to decode each of the determined one or more transform blocks from the bitstream to decode the image frame.

Another aspect of the present disclosure provides a video decoding apparatus for decoding an image frame from a bitstream, the image frame being divided into a plurality of coding tree units, each of the coding tree units being divided into one or more coding units, the video decoding apparatus comprising: a first decoding unit configured to decode a maximum coding tree unit size constraint from the bitstream; a second decoding unit configured to decode a maximum enabled coding tree unit size from the bitstream, the decoded maximum enabled coding tree unit size being less than or equal to the decoded maximum coding unit size constraint; a determining unit configured to determine the one or more coding units for each of the plurality of coding tree units according to the decoded maximum enabled coding tree size and split flags decoded from the bitstream;

and a third decoding unit configured to decode the image frame using the decoded one or more coding units.

Another aspect of the present disclosure provides a video decoding apparatus for decoding an image frame from a bitstream, the image frame being divided into a plurality of coding tree units, each of the coding tree units being divided into one or more coding blocks, the video decoding apparatus comprising: a first decoding unit configured to decode, from the bitstream, a first flag which indicates constraint on use of a scaling list, the flag being included in general constraints information syntax; a second decoding unit configured to decode, from the bitstream, a second flag indicates enablement of the scaling list, the second flag being constrained by the first flag; a third decoding unit configured to decode the one or more coding blocks from the bitstream with scaling performed according to a value of the second flag; and a fourth decoding unit configured to decode the image frame using the decoded one or more coding units.

Another aspect of the present disclosure provides a non-transitory computer-readable medium having a computer program stored thereon to implement a method of decoding an image frame from a bitstream, the image frame being divided into a plurality of coding tree units, each of the coding tree units being divided into one or more coding units, the method comprising: decoding a maximum coding tree unit size constraint from the bitstream; decoding a maximum enabled coding tree unit size from the bitstream, the decoded maximum enabled coding tree unit size being less than or equal to the decoded maximum coding unit size constraint; determining the one or more coding units for each of the plurality of coding tree units according to the decoded maximum enabled coding tree size and split flags decoded from the bitstream; and decoding each of the determined one or more coding units from the bitstream to decode the image frame.

Another aspect of the present disclosure provides a non-transitory computer-readable medium having a computer program stored thereon to implement a method of decoding an image frame from a bitstream, the image frame being divided into a plurality of coding tree units, each of the coding tree units being divided into one or more coding blocks, the method comprising: decoding, from the bitstream, a first flag which indicates constraint on use of a scaling list, the flag being included in general constraints information syntax; decoding, from the bitstream, a second flag indicates enablement of the scaling list, the second flag being constrained by the first flag; decoding the one or more coding blocks from the bitstream with scaling performed according to a value of the second flag; and decoding the image frame using the decoded one or more coding units to decode the image frame.

Other aspects are also disclosed.

BRIEF DESCRIPTION OF THE DRAWINGS

At least one embodiment of the present invention will now be described with reference to the following drawings and and appendix, in which.

DETAILED DESCRIPTION INCLUDING BEST MODE

Figure 1:
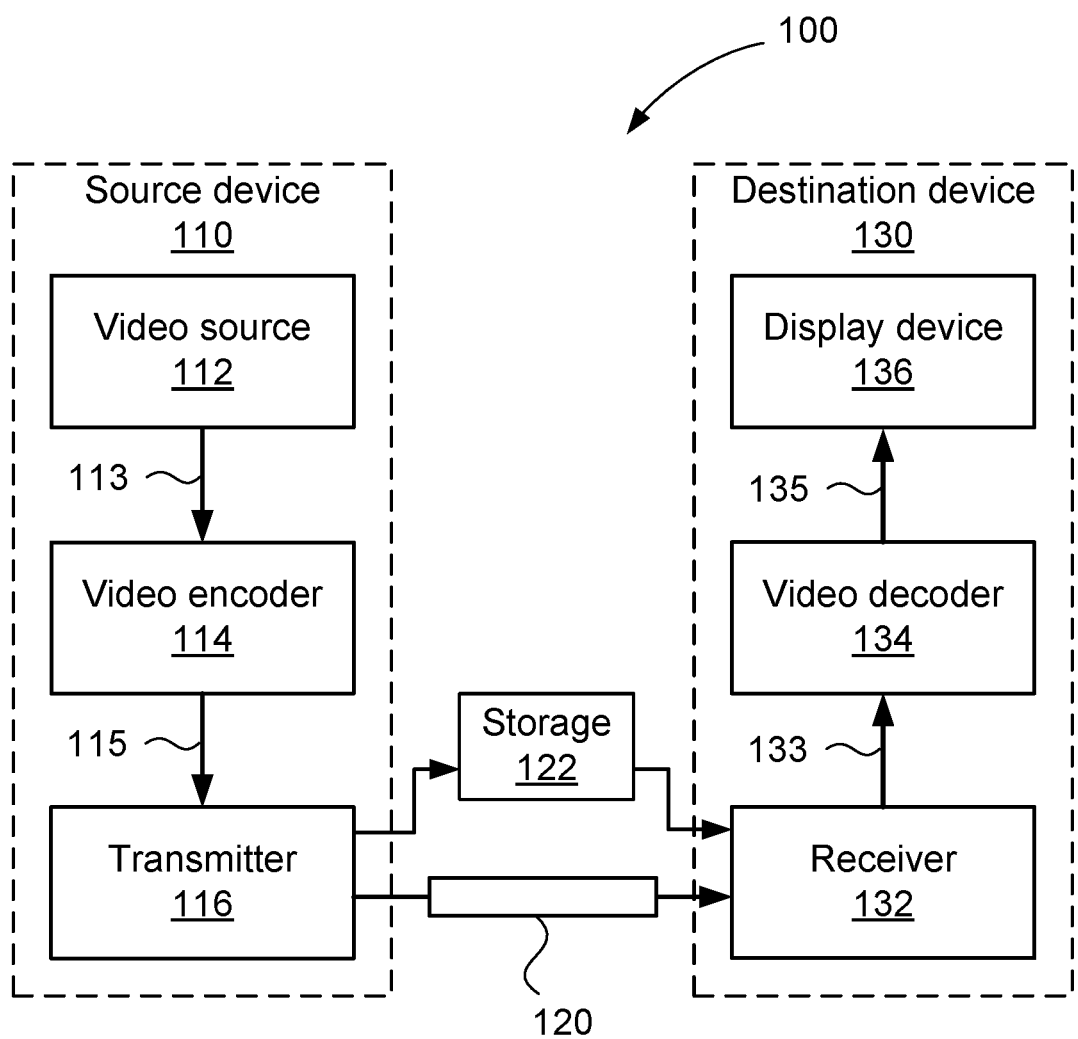
FIG. 1 is a schematic block diagram showing a video encoding and decoding system.

Where reference is made in any one or more of the accompanying drawings to steps and/or features, which have the same reference numerals, those steps and/or features have for the purposes of this description the same function (s) or operation(s), unless the contrary intention appears.

VVC encoders and decoders include a capability signalling mechanism known as 'constraints'. Early in the bitstream, a set of constraints are present that indicate which capabilities of the VVC standard are not used in the bitstream. Constraints are signalled along with the 'profile' and 'level' of the bitstream. The profile indicates broadly which set of tools is required to be available to decode the bitstream. Constraints also provide a fine granularity of control of which tools are further constrained in the specified profile. The further constraining is referred to as 'subprofiling'. Subprofiling allows specific tools to be effectively removed from a profile even after the profile is defined, with implementers agreeing on a common subprofile to be deployed. For example, if a given tool is found, despite the analytical effort of the SSO, to be problematic to implement, the tool may be later removed. One use of subprofiling is to reduce a 'proliferation' of profiles, some of which may never be used. Defining fewer profiles helps avoid market fragmentation of the implementations of the VVC standard. Profiles and subprofiles also define what is termed an 'interoperability point'. The interoperability point is a set of tools agreed upon by manufacturers to be supported by their implementations. Profiles are agreed upon at the time of finalising the standard and subprofiles are able to be agreed upon at a later date, allowing unforeseen implementation complexity or other issue of particular tools to be addressed without needing to add additional profiles to the standard. A particular encoder may choose to further limit use of coding tools, for example for complexity reduction purposes, without departing from an agreed-upon profile and sub-profile definition of resulting bitstreams. Any further limiting of tool selection may be signalled early in the bitstream, resulting in suppression of signalling for the unused tools. Alternatively, the encoder may leave the tool available but never signal the tool's use (leaving in the signalling to control the tool but always choosing the disabled value).

FIG. 1 is a schematic block diagram showing functional modules of a video encoding and decoding system 100. In addition to constraints on particular coding tools, the system 100 includes constraints on block structures, providing further flexibility for subprofiling.

The system 100 includes a source device 110 and a destination device 130. A communication channel 120 is used to communicate encoded video information from the source device 110 to the destination device 130. In some arrangements, the source device 110 and destination device 130 may either or both comprise respective mobile telephone handsets or "smartphones", in which case the communication channel 120 is a wireless channel. In other arrangements, the source device 110 and destination device 130 may comprise video conferencing equipment, in which case the communication channel 120 is typically a wired channel, such as an internet connection. Moreover, the source device 110 and the destination device 130 may comprise any of a wide range of devices, including devices supporting over-the-air television broadcasts, cable television applications, internet video applications (including streaming) and applications where encoded video data is captured on some computer-readable storage medium, such as hard disk drives in a file server.

As shown in FIG. 1, the source device 110 includes a video source 112, a video encoder 114 and a transmitter 116. The video source 112 typically comprises a source of captured video frame data (shown as 113), such as an image capture sensor, a previously captured video sequence stored on a non-transitory recording medium, or a video feed from a remote image capture sensor. The video source 112 may also be an output of a computer graphics card, for example displaying the video output of an operating system and various applications executing upon a computing device, for example a tablet computer. Examples of source devices 110 that may include an image capture sensor as the video source 112 include smart-phones, video camcorders, professional video cameras, and network video cameras.

Figure 3:
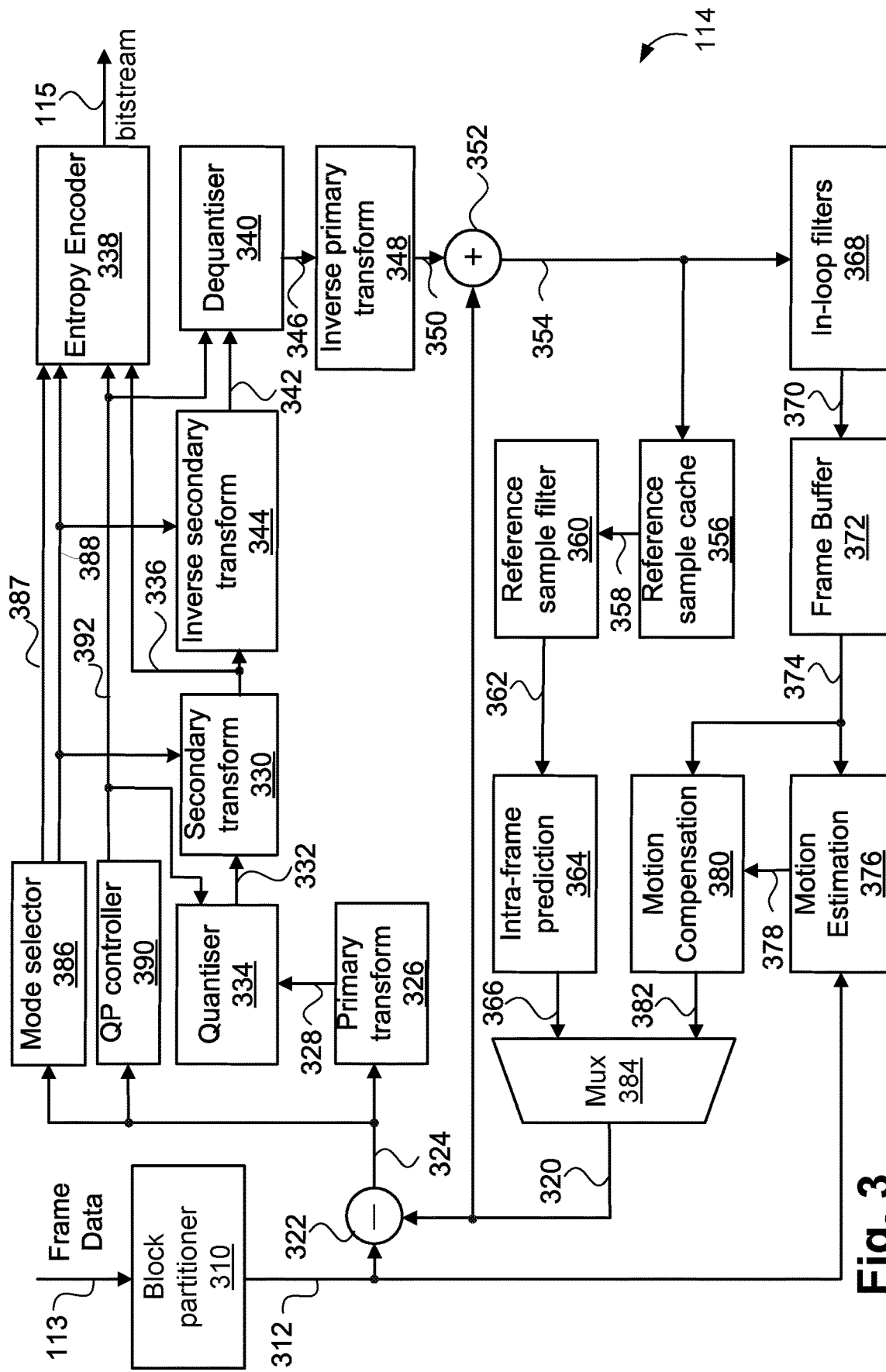
FIG. 3 is a schematic block diagram showing functional modules of a video encoder.

The video encoder 114 converts (or 'encodes') the captured frame data (indicated by an arrow 113) from the video source 112 into a bitstream (indicated by an arrow 115) as described further with reference to FIG. 3. The video encoder 114 uses a particular set of coding tools (or 'profile') of VVC to encode the captured frame data 113. An indication of which profile was used is encoded into the bitstream 115 using a 'profile_tier_level' syntax structure embedded either in a 'video parameter set' (VPS) or a 'sequence parameter set' (SPS) of the bitstream 115. The SPS syntax structure is also named 'seq_parameter_set_rbsp( )' and the VPS syntax structure is also named 'video_parameter_set_rbsp( )'. Additionally, further constraints on the set of coding tools used may also be encoded into the bitstream 115 using a 'general_constraint_info' syntax structure that is part of the aforementioned profile_tier_level syntax structure. Scaling lists, filters for ALF, and parameters for LMCS are sent in one or more 'adaptation parameter sets' (APSs). Each APS includes parameters for one of these three tools, identified by an 'aps_params_type' syntax element in the respective APS.

The bitstream 115 is transmitted by the transmitter 116 over the communication channel 120 as encoded video data (or "encoded video information"). The bitstream 115 can in some implementations be stored in a non-transitory storage device 122, such as a "Flash" memory or a hard disk drive, until later being transmitted over the communication channel 120, or in-lieu of transmission over the communication channel 120. For example, encoded video data may be served upon demand to customers over a wide area network (WAN) for a video streaming application.

The destination device 130 includes a receiver 132, a video decoder 134 and a display device 136. The receiver 132 receives encoded video data from the communication channel 120 and passes received video data to the video decoder 134 as a bitstream (indicated by an arrow 133). The video decoder 134 then outputs decoded frame data (indicated by an arrow 135) to the display device 136 for display as a video. The decoded frame data 135 has the same chroma format as the frame data 113. Examples of the display device 136 include a cathode ray tube, a liquid crystal display, such as in smart-phones, tablet computers, computer monitors or in stand-alone television sets. It is also possible for the functionality of each of the source device 110 and the destination device 130 to be embodied in a single device, examples of which include mobile telephone handsets and tablet computers. Decoded frame data may be further transformed before presentation to a user. For example, a 'viewport' having a particular latitude and longitude may be rendered from decoded frame data using a projection format to represent a 360° view of a scene.

Figure 2A:
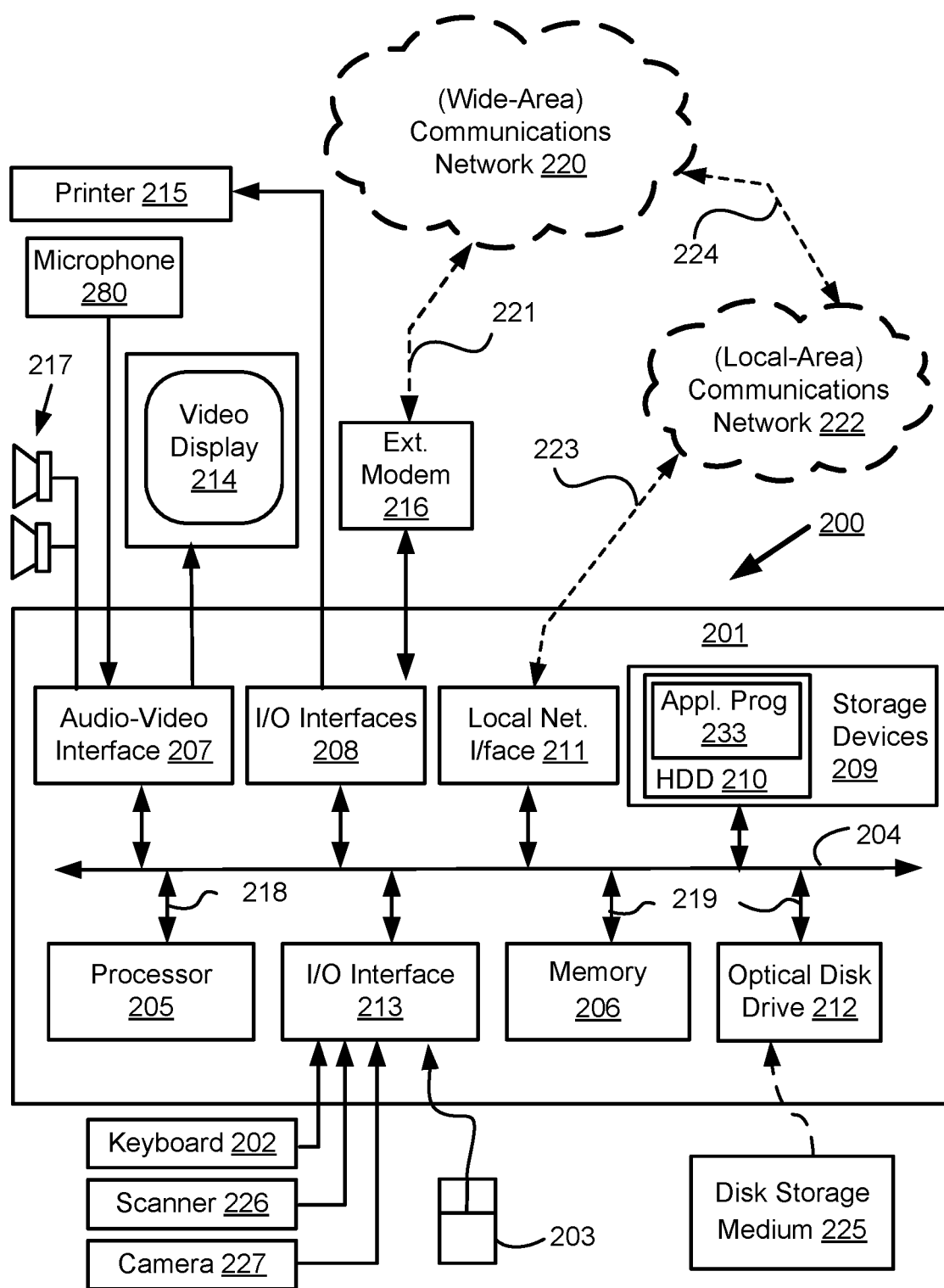
FIGS. 2A and 2B form a schematic block diagram of a general purpose computer system upon which one or both of the video encoding and decoding system of FIG. 1 may be practiced.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable or optical) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes a number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 130 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200. In particular, the video encoder 114, the video decoder 134 and methods to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels, as well as a network connection to another computer or networked device, and the Internet or Intranets including e-mail transmissions and information recorded on Websites and the like.

The second part of the application program 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
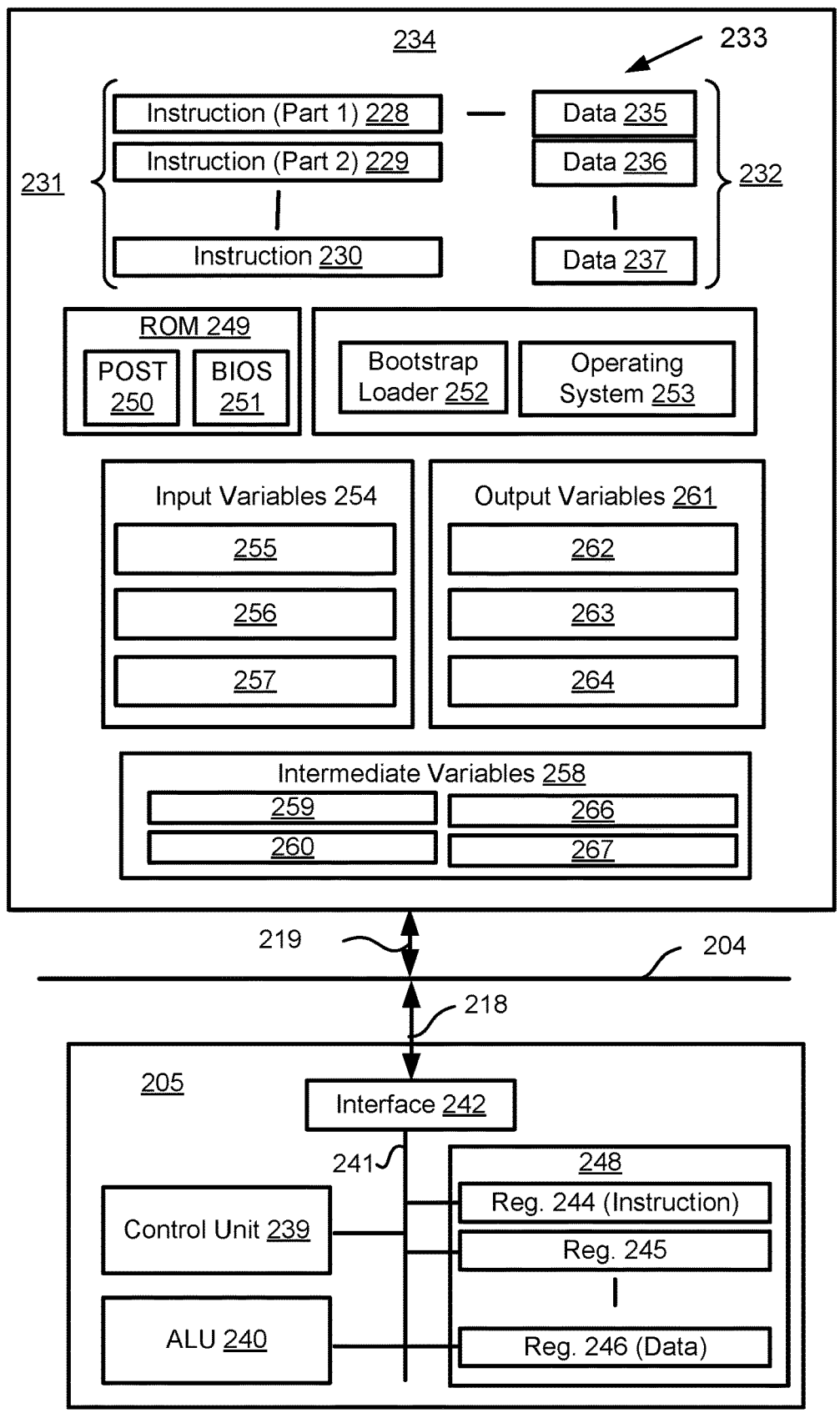

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Figure 10:
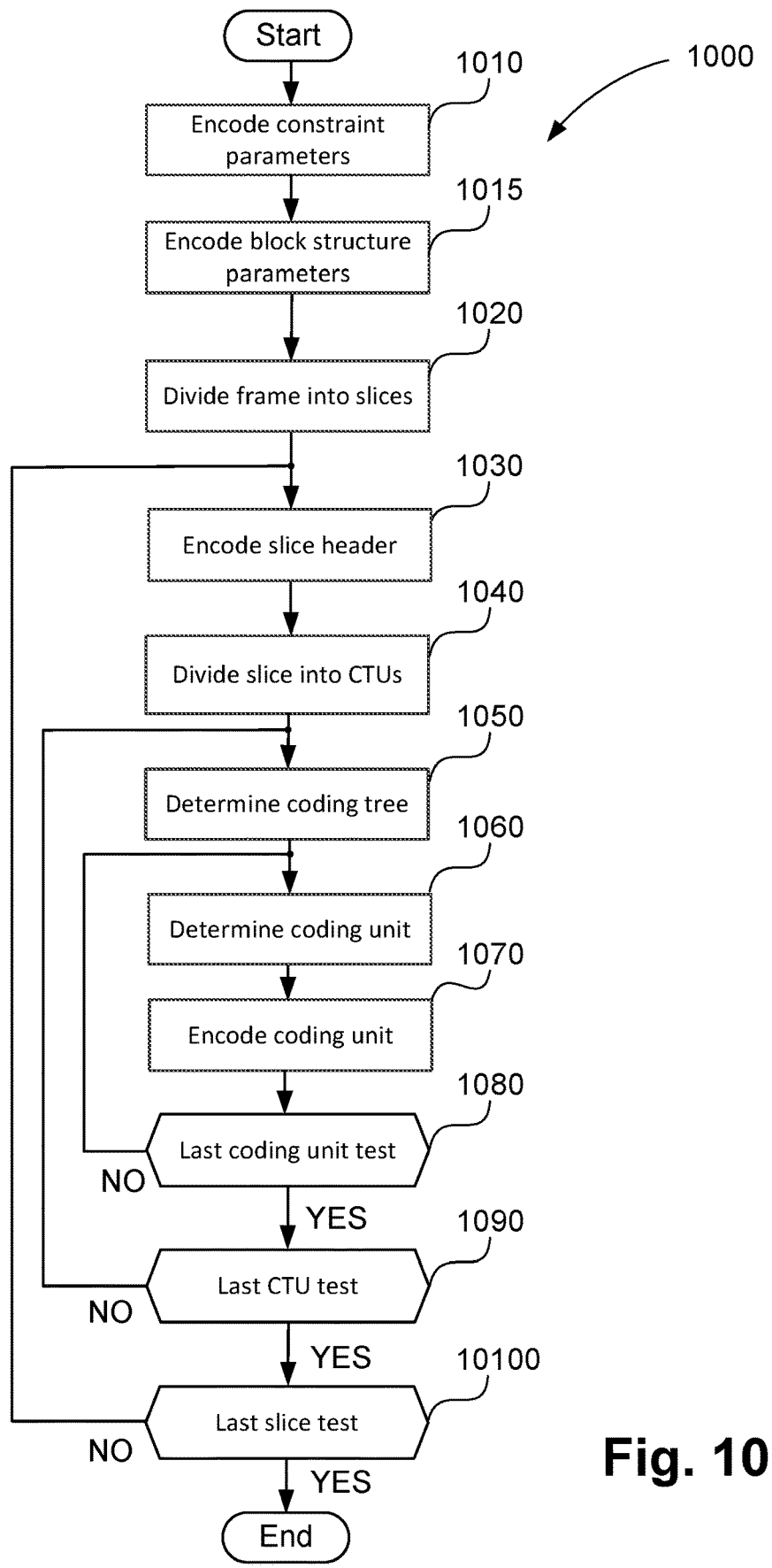
FIG. 10 shows a method for encoding a frame into a bitstream including one or more slices as sequences of coding units.
Figure 11:
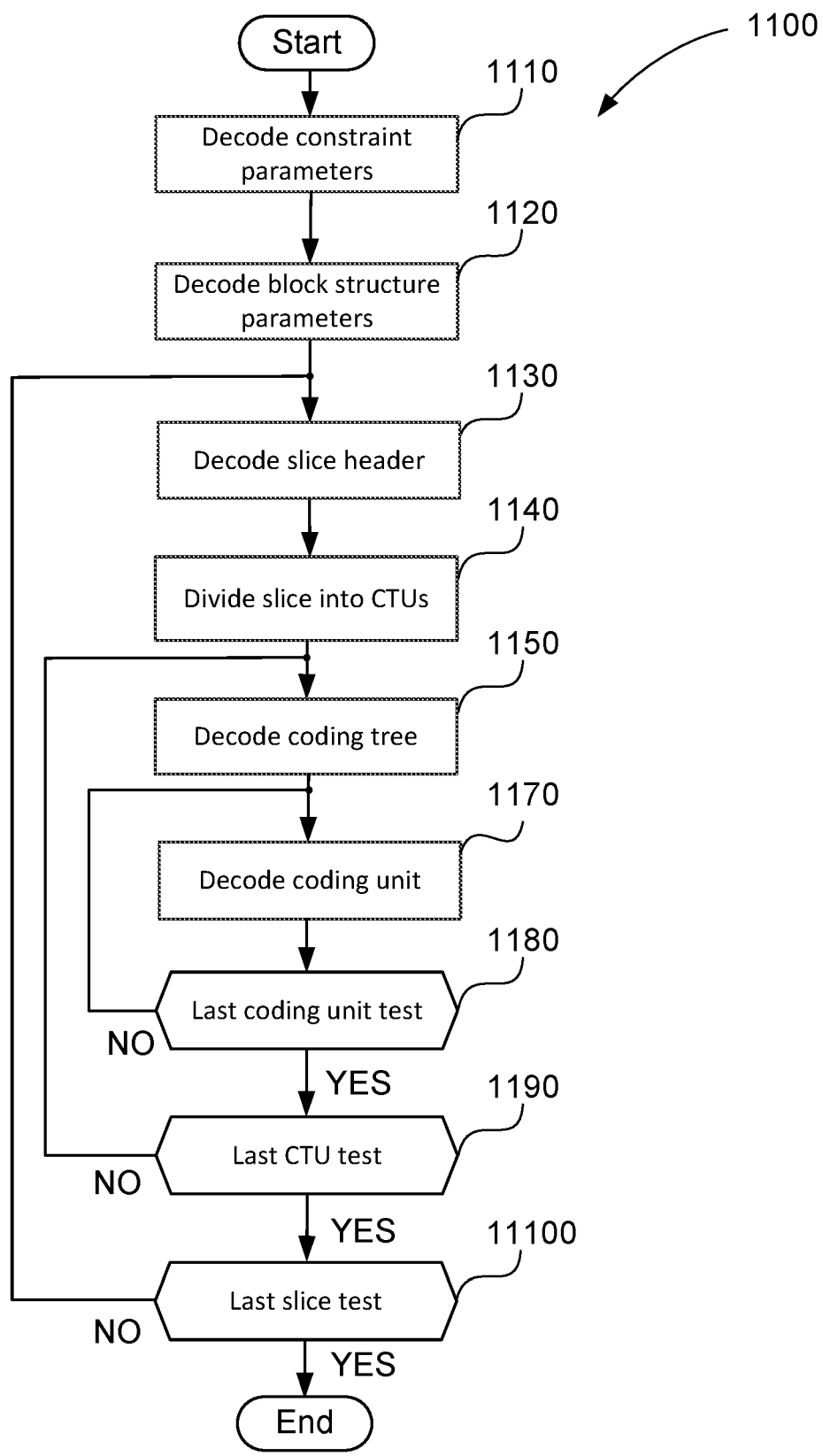
FIG. 11 shows a method for decoding a frame from a bitstream as sequences of coding units arranged into slices.

Each step or sub-process in the method of FIGS. 10 and 11, to be described, is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 4:
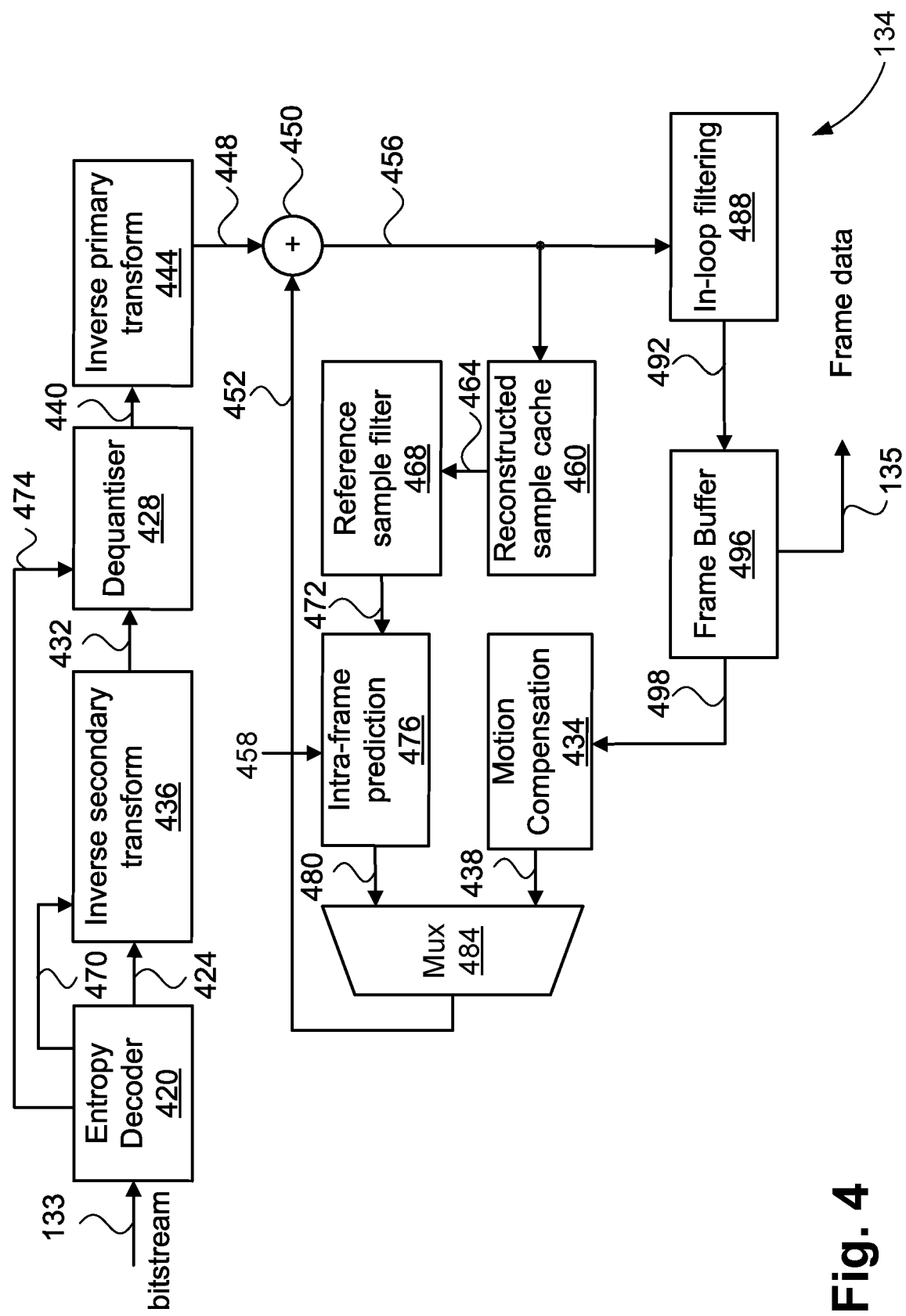
FIG. 4 is a schematic block diagram showing functional modules of a video decoder.

FIG. 3 is a schematic block diagram showing functional modules of the video encoder 114. FIG. 4 is a schematic block diagram showing functional modules of the video decoder 134. Generally, data passes between functional modules within the video encoder 114 and the video decoder 134 in groups of samples or coefficients, such as divisions of blocks into sub-blocks of a fixed size, or as arrays. The video encoder 114 and video decoder 134 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205. Alternatively, the video encoder 114 and video decoder 134 may be implemented by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processing units (GPUs), digital signal processors (DSPs), application-specific standard products (ASSPs), application-specific integrated circuits (ASICs), field programmable gate arrays (FPGAs) or one or more microprocessors and associated memories. In particular, the video encoder 114 comprises modules 310-390 and the video decoder 134 comprises modules 420-496 which may each be implemented as one or more software code modules of the software application program 233.

Although the video encoder 114 of FIG. 3 is an example of a versatile video coding (VVC) video encoding pipeline, other video codecs may also be used to perform the processing stages described herein. The video encoder 114 receives captured frame data 113, such as a series of frames, each frame including one or more colour channels. The frame data 113 may be in any chroma format, for example 4:0:0, 4:2:0, 4:2:2, or 4:4:4 chroma format. A block partitioner 310 firstly divides the frame data 113 into CTUs, generally square in shape and configured such that a particular size for the CTUs is used. The maximum enabled size of the CTUs may be 32×32, 64×64, or 128×128 luma samples for example, configured by a 'sps_log 2_ctu_size_minus5' syntax element present in the 'sequence parameter set'. The CTU size also provides a maximum CU size, as a CTU with no further splitting will contain one CU. The block partitioner 310 further divides each CTU into one or more CBs according to a luma coding tree and a chroma coding tree. The luma channel may also be referred to as a primary colour channel. Each chroma channel may also be referred to as a secondary colour channel. The CBs have a variety of sizes, and may include both square and non-square aspect ratios. Operation of the block partitioner 310 is further described with reference to FIG. 10. However, in the VVC standard, CBs, CUs, PUs, and TUs always have side lengths that are powers of two. Thus, a current CB, represented as 312, is output from the block partitioner 310, progressing in accordance with an iteration over the one or more blocks of the CTU, in accordance with the luma coding tree and the chroma coding tree of the CTU. Options for partitioning CTUs into CBs are further described below with reference to FIGS. 5 and 6. Although operation is generally described on a CTU-by-CTU basis, the video encoder 114 and the video decoder 134 can operate on a smaller-sized region to reduce memory consumption. For example, each CTU can be divided into smaller regions, known as 'virtual pipeline data units' (VPDUs) of size 64×64. The VPDUs form a granularity of data that is more amenable to pipeline processing in hardware architectures where the reduction in memory footprint reduces silicon area and hence cost, compared to operating on full CTUs. When the CTU size is 128×128, restrictions on allowed coding trees are in place to ensure that processing of one VPDU is fully completed before progressing to the next VPDU. For example, at the root node of the coding tree of a 128×128 CTU, ternary splitting is prohibited as the resulting CUs (such as 32×128/128×32 or further decompositions thereof) could not be processed with the required progression from one 64×64 region to a subsequent 64×64 region. When the CTU size is 64×64, regardless of the coding tree selected by the encoder, processing necessarily completes one 64×64 region before progressing to the next 64×64 region, i.e. from one CTU to the next.

The CTUs resulting from the first division of the frame data 113 may be scanned in raster scan order and may be grouped into one or more 'slices'. A slice may be an 'intra' (or 'I') slice. An intra slice (I slice) indicates that every CU in the slice is intra predicted. Alternatively, a slice may be uni- or bi-predicted ('P' or 'B' slice, respectively), indicating additional availability of uni- and bi-prediction in the slice, respectively.

In an I slice, the coding tree of each CTU may diverge below the 64×64 level into two separate coding trees, one for luma and another for chroma. Use of separate trees allows different block structure to exist between luma and chroma within a luma 64×64 area of a CTU. For example, a large chroma CB may be collocated with numerous smaller luma CBs and vice versa. In a P or B slice, a single coding tree of a CTU defines a block structure common to luma and chroma. The resulting blocks of the single tree may be intra predicted or inter predicted.

For each CTU, the video encoder 114 operates in two stages. In the first stage (referred to as a 'search' stage), the block partitioner 310 tests various potential configurations of a coding tree. Each potential configuration of a coding tree has associated 'candidate' CBs. The first stage involves testing various candidate CBs to select CBs providing relatively high compression efficiency with relatively low distortion. The testing generally involves a Lagrangian optimisation whereby a candidate CB is evaluated based on a weighted combination of the rate (coding cost) and the distortion (error with respect to the input frame data 113). The 'best' candidate CBs (the CBs with the lowest evaluated rate/distortion) are selected for subsequent encoding into the bitstream 115. Included in evaluation of candidate CBs is an option to use a CB for a given area or to further split the area according to various splitting options and code each of the smaller resulting areas with further CBs, or split the areas even further. As a consequence, both the coding tree and the CBs themselves are selected in the search stage.

The video encoder 114 produces a prediction block (PB), indicated by an arrow 320, for each CB, for example the CB 312. The PB 320 is a prediction of the contents of the associated CB 312. A subtracter module 322 produces a difference, indicated as 324 (or 'residual', referring to the difference being in the spatial domain), between the PB 320 and the CB 312. The difference 324 is a block-size difference between corresponding samples in the PB 320 and the CB 312. The difference 324 is transformed, quantised and represented as a transform block (TB), indicated by an arrow 336. The PB 320 and associated TB 336 are typically chosen from one of many possible candidate CBs, for example based on evaluated cost or distortion.

A candidate coding block (CB) is a CB resulting from one of the prediction modes available to the video encoder 114 for the associated PB and the resulting residual. When combined with the predicted PB in the video decoder 114, the TB 336 reduces the difference between a decoded CB and the original CB 312 at the expense of additional signalling in a bitstream.

Each candidate coding block (CB), that is prediction block (PB) in combination with a transform block (TB), thus has an associated coding cost (or 'rate') and an associated difference (or 'distortion'). The distortion of the CB is typically estimated as a difference in sample values, such as a sum of absolute differences (SAD) or a sum of squared differences (SSD). The estimate resulting from each candidate PB may be determined by a mode selector 386 using the difference 324 to determine a prediction mode 387. The prediction mode 387 indicates the decision to use a particular prediction mode for the current CB, for example intra-frame prediction or inter-frame prediction. Estimation of the coding costs associated with each candidate prediction mode and corresponding residual coding can be performed at significantly lower cost than entropy coding of the residual. Accordingly, a number of candidate modes can be evaluated to determine an optimum mode in a rate-distortion sense even in a real-time video encoder.

Determining an optimum mode in terms of rate-distortion is typically achieved using a variation of Lagrangian optimisation.

Lagrangian or similar optimisation processing can be employed to both select an optimal partitioning of a CTU into CBs (by the block partitioner 310) as well as the selection of a best prediction mode from a plurality of possibilities. Through application of a Lagrangian optimisation process of the candidate modes in the mode selector module 386, the intra prediction mode with the lowest cost measurement is selected as the 'best' mode. The lowest cost mode includes the selected secondary transform index 388, which is also encoded in the bitstream 115 by an entropy encoder 338.

In the second stage of operation of the video encoder 114 (referred to as a 'coding' stage), an iteration over the determined coding tree(s) of each CTU is performed in the video encoder 114. For a CTU using separate trees, for each 64×64 luma region of the CTU, a luma coding tree is firstly encoded followed by a chroma coding tree. Within the luma coding tree only luma CBs are encoded and within the chroma coding tree only chroma CBs are encoded. For a CTU using a shared tree, a single tree describes the CUs, i.e., the luma CBs and the chroma CBs according to the common block structure of the shared tree.

The entropy encoder 338 supports both variable-length coding of syntax elements and arithmetic coding of syntax elements. Portions of the bitstream such as 'parameter sets', for example sequence parameter set (SPS) and picture parameter set (PPS) use a combination of fixed-length codewords and variable-length codewords. Slices (also referred to as contiguous portions) have a slice header that uses variable length coding followed by slice data, which uses arithmetic coding. The slice header defines parameters specific to the current slice, such as slice-level quantisation parameter offsets. The slice data includes the syntax elements of each CTU in the slice. Use of variable length coding and arithmetic coding requires sequential parsing within each portion of the bitstream. The portions may be delineated with a start code to form 'network abstraction layer units' or 'NAL units'. Arithmetic coding is supported using a context-adaptive binary arithmetic coding process. Arithmetically coded syntax elements consist of sequences of one or more 'bins'. Bins, like bits, have a value of '0' or '1'. However, bins are not encoded in the bitstream 115 as discrete bits. Bins have an associated predicted (or 'likely' or 'most probable') value and an associated probability, known as a 'context'. When the actual bin to be coded matches the predicted value, a 'most probable symbol' (MPS) is coded. Coding a most probable symbol is relatively inexpensive in terms of consumed bits in the bitstream 115, including costs that amount to less than one discrete bit. When the actual bin to be coded mismatches the likely value, a 'least probable symbol' (LPS) is coded. Coding a least probable symbol has a relatively high cost in terms of consumed bits. The bin coding techniques enable efficient coding of bins where the probability of a '0' versus a '1' is skewed. For a syntax element with two possible values (that is, a 'flag'), a single bin is adequate. For syntax elements with many possible values, a sequence of bins is needed.

The presence of later bins in the sequence may be determined based on the value of earlier bins in the sequence. Additionally, each bin may be associated with more than one context. The selection of a particular context can be dependent on earlier bins in the syntax element, the bin values of neighbouring syntax elements (i.e. those from neighbouring blocks) and the like. Each time a context-coded bin is encoded, the context that was selected for that bin (if any) is updated in a manner reflective of the new bin value. As such, the binary arithmetic coding scheme is said to be adaptive.

Also supported by the video encoder 114 are bins that lack a context ('bypass bins'). Bypass bins are coded assuming an equiprobable distribution between a '0' and a '1'. Thus, each bin has a coding cost of one bit in the bitstream 115. The absence of a context saves memory and reduces complexity, and thus bypass bins are used where the distribution of values for the particular bin is not skewed. One example of an entropy coder employing context and adaption is known in the art as CABAC (context adaptive binary arithmetic coder) and many variants of this coder have been employed in video coding.

The entropy encoder 338 encodes a quantisation parameter 392 and, if in use for the current CB, the LFNST index 388, using a combination of context-coded and bypass-coded bins. The quantisation parameter 392 is encoded using a 'delta QP'. The delta QP is signalled at most once in each area known as a 'quantisation group'. The quantisation parameter 392 is applied to residual coefficients of the luma CB. An adjusted quantisation parameter is applied to the residual coefficients of collocated chroma CBs. The adjusted quantisation parameter may include mapping from the luma quantisation parameter 392 according to a mapping table and a CU-level offset, selected from a list of offsets. The secondary transform index 388 is signalled when the residual associated with the transform block includes significant residual coefficients only in those coefficient positions subject to transforming into primary coefficients by application of a secondary transform.

A multiplexer module 384 outputs the PB 320 from an intra-frame prediction module 364 according to the determined best intra prediction mode, selected from the tested prediction mode of each candidate CB. The candidate prediction modes need not include every conceivable prediction mode supported by the video encoder 114. Intra prediction falls into three types. "DC intra prediction" involves populating a PB with a single value representing the average of nearby reconstructed samples. "Planar intra prediction" involves populating a PB with samples according to a plane, with a DC offset and a vertical and horizontal gradient being derived from the nearby reconstructed neighbouring samples. The nearby reconstructed samples typically include a row of reconstructed samples above the current PB, extending to the right of the PB to an extent and a column of reconstructed samples to the left of the current PB, extending downwards beyond the PB to an extent. "Angular intra prediction" involves populating a PB with reconstructed neighbouring samples filtered and propagated across the PB in a particular direction (or 'angle'). In VVC 65 angles are supported, with rectangular blocks able to utilise additional angles, not available to square blocks, to produce a total of 87 angles. A fourth type of intra prediction is available to chroma PBs, whereby the PB is generated from collocated luma reconstructed samples according to a 'cross-component linear model' (CCLM) mode. Three different CCLM modes are available, each mode using a different model derived from the neighbouring luma and chroma samples. The derived model is used to generate a block of samples for the chroma PB from the collocated luma samples.

Where previously reconstructed samples are unavailable, for example at the edge of the frame, a default half-tone value of one half the range of the samples is used. For example, for 10-bit video a value of 512 is used. As no previously samples are available for a CB located at the top-left position of a frame, angular and planar intra-prediction modes produce the same output as the DC prediction mode, i.e. a flat plane of samples having the half-tone value as magnitude.

For inter-frame prediction a prediction block 382 is produced using samples from one or two frames preceding the current frame in the coding order frames in the bitstream by a motion compensation module 380 and output as the PB 320 by the multiplexer module 384. Moreover, for inter-frame prediction, a single coding tree is typically used for both the luma channel and the chroma channels. The order of coding frames in the bitstream may differ from the order of the frames when captured or displayed. When one frame is used for prediction, the block is said to be 'uni-predicted' and has one associated motion vector. When two frames are used for prediction, the block is said to be 'bi-predicted' and has two associated motion vectors. For a P slice, each CU may be intra predicted or uni-predicted. For a B slice, each CU may be intra predicted, uni-predicted, or bi-predicted. Frames are typically coded using a 'group of pictures' structure, enabling a temporal hierarchy of frames. Frames may be divided into multiple slices, each of which encodes a portion of the frame. A temporal hierarchy of frames allows a frame to reference a preceding and a subsequent picture in the order of displaying the frames. The images are coded in the order necessary to ensure the dependencies for decoding each frame are met.

The samples are selected according to a motion vector 378 and reference picture index. The motion vector 378 and reference picture index applies to all colour channels and thus inter prediction is described primarily in terms of operation upon PUs rather than PBs, i.e. the decomposition of each CTU into one or more inter-predicted blocks is described with a single coding tree. Inter prediction methods may vary in the number of motion parameters and their precision. Motion parameters typically comprise a reference frame index, indicating which reference frame(s) from lists of reference frames are to be used plus a spatial translation for each of the reference frames, but may include more frames, special frames, or complex affine parameters such as scaling and rotation. In addition, a pre-determined motion refinement process may be applied to generate dense motion estimates based on referenced sample blocks.

Having determined and selected the PB 320, and subtracted the PB 320 from the original sample block at the subtractor 322, a residual with lowest coding cost, represented as 324, is obtained and subjected to lossy compression. The lossy compression process comprises the steps of transformation, quantisation and entropy coding. A forward primary transform module 326 applies a forward transform to the difference 324, converting the difference 324 from the spatial domain to the frequency domain, and producing primary transform coefficients represented by an arrow 328. The largest primary transform size in one dimension is either a 32-point DCT-2 or a 64-point DCT-2 transform, configured by a 'sps_max_luma_transform_size_64_flag' in the sequence parameter set. If the CB being encoded is larger than the largest supported primary transform size expressed as a block size, e.g. 64×64 or 32×32, the primary transform 326 is applied in a tiled manner to transform all samples of the difference 324. Where a non-square CB is used, tiling is also performed using the largest available transform size in each dimension of the CB. For example, when a maximum transform size of 32 is used, a 64×16 CB uses two 32×16 primary transforms arranged in a tiled manner. When a CB is larger in size than the maximum supported transform size, the CB is filled with TBs in a tiled manner. For example, a 128×128 CB with 64-pt transform maximum size is filled with four 64×64 TBs in a 2×2 arrangement. A 64×128 CB with a 32-pt transform maximum size is filled with eight 32×32 TBs in a 2×4 arrangement.

Application of the transform 326 results in multiple TBs for the CB. Where each application of the transform operates on a TB of the difference 324 larger than 32×32, e.g. 64×64, all resulting primary transform coefficients 328 outside of the upper-left 32×32 area of the TB are set to zero, i.e. discarded. The remaining primary transform coefficients 328 are passed to a quantiser module 334. The primary transform coefficients 328 are quantised according to a quantisation parameter 392 associated with the CB to produce primary transform coefficients 332. In addition to the quantisation parameter 392, the quantiser module 334 may also apply a 'scaling list' to allow non-uniform quantisation within the TB by further scaling residual coefficients according to their spatial position within the TB. The quantisation parameter 392 may differ for a luma CB versus each chroma CB. The primary transform coefficients 332 are passed to a forward secondary transform module 330 to produce transform coefficients represented by the arrow 336 by performing either a non-separable secondary transform (NSST) operation or bypassing the secondary transform. The forward primary transform is typically separable, transforming a set of rows and then a set of columns of each TB. The forward primary transform module 326 uses either a type-II discrete cosine transform (DCT-2) in the horizontal and vertical directions, or bypass of the transform horizontally and vertically, or combinations of a type-VII discrete sine transform (DST-7) and a type-VIII discrete cosine transform (DCT-8) in either horizontal or vertical directions for luma TBs not exceeding 16 samples in width and height. Use of combinations of a DST-7 and DCT-8 is referred to as 'multi transform selection set' (MTS) in the VVC standard.

The forward secondary transform of the module 330 is generally a non-separable transform, which is only applied for the residual of intra-predicted CUs and may nonetheless also be bypassed. The forward secondary transform operates either on 16 samples (arranged as the upper-left 4×4 sub-block of the primary transform coefficients 328) or 48 samples (arranged as three 4×4 sub-blocks in the upper-left 8×8 coefficients of the primary transform coefficients 328) to produce a set of secondary transform coefficients. The set of secondary transform coefficients may be fewer in number than the set of primary transform coefficients from which they are derived. Due to application of the secondary transform to only a set of coefficients adjacent to each other and including the DC coefficient, the secondary transform is referred to as a 'low frequency non-separable secondary transform' (LFNST). Moreover, when the LFNST is applied, all remaining coefficients in the TB must be zero, both in the primary transform domain and the secondary transform domain.

The quantisation parameter 392 is constant for a given TB and thus results in a uniform scaling for the production of residual coefficients in the primary transform domain for a TB. The quantisation parameter 392 may vary periodically with a signalled 'delta quantisation parameter'. The delta quantisation parameter (delta QP) is signalled once for CUs contained within a given area, referred to as a 'quantisation group'. If a CU is larger than the quantisation group size, delta QP is signalled once with one of the TBs of the CU. That is, the delta QP is signalled by the entropy encoder 338 once for the first quantisation group of the CU and not signalled for any subsequent quantisation groups of the CU. A non-uniform scaling is also possible by application of a 'quantisation matrix', whereby the scaling factor applied for each residual coefficient is derived from a combination of the quantisation parameter 392 and the corresponding entry in a scaling matrix. The scaling matrix can have a size that is smaller than the size of the TB, and when applied to the TB a nearest neighbour approach is used to provide scaling values for each residual coefficient from a scaling matrix smaller in size than the TB size. The residual coefficients 336 are supplied to the entropy encoder 338 for encoding in the bitstream 115. Typically, the residual coefficients of each TB with at least one significant residual coefficient of the TU are scanned to produce an ordered list of values, according to a scan pattern. The scan pattern generally scans the TB as a sequence of 4×4 'sub-blocks', providing a regular scanning operation at the granularity of 4×4 sets of residual coefficients, with the arrangement of sub-blocks dependent on the size of the TB. The scan within each sub-block and the progression from one sub-block to the next typically follow a backward diagonal scan pattern. Additionally, the quantisation parameter 392 is encoded into the bitstream 115 using a delta QP syntax element and the secondary transform index 388 is encoded in the bitstream 115.

As described above, the video encoder 114 needs access to a frame representation corresponding to the decoded frame representation seen in the video decoder 134. Thus, the residual coefficients 336 are passed through an inverse secondary transform module 344, operating in accordance with the secondary transform index 388 to produce intermediate inverse transform coefficients, represented by an arrow 342. The intermediate inverse transform coefficients are inverse quantised by a dequantiser module 340 according to the quantisation parameter 392 to produce inverse transform coefficients, represented by an arrow 346. The dequantiser module 340 may also perform an inverse non-uniform scaling of residual coefficients using a scaling list, corresponding to the forward scaling performed in the quantiser module 334. The intermediate inverse transform coefficients 346 are passed to an inverse primary transform module 348 to produce residual samples, represented by an arrow 350, of the TU. The inverse primary transform module 348 applies DCT-2 transforms horizontally and vertically, constrained by the maximum available transform size as described with reference to the forward primary transform module 326. The types of inverse transform performed by the inverse secondary transform module 344 correspond with the types of forward transform performed by the forward secondary transform module 330. The types of inverse transform performed by the inverse primary transform module 348 correspond with the types of primary transform performed by the primary transform module 326. A summation module 352 adds the residual samples 350 and the PU 320 to produce reconstructed samples (indicated by an arrow 354) of the CU.

The reconstructed samples 354 are passed to a reference sample cache 356 and an in-loop filters module 368. The reference sample cache 356, typically implemented using static RAM on an ASIC (thus avoiding costly off-chip memory access) provides minimal sample storage needed to satisfy the dependencies for generating intra-frame PBs for subsequent CUs in the frame. The minimal dependencies typically include a 'line buffer' of samples along the bottom of a row of CTUs, for use by the next row of CTUs and column buffering the extent of which is set by the height of the CTU. The reference sample cache 356 supplies reference samples (represented by an arrow 358) to a reference sample filter 360. The sample filter 360 applies a smoothing operation to produce filtered reference samples (indicated by an arrow 362). The filtered reference samples 362 are used by an intra-frame prediction module 364 to produce an intra-predicted block of samples, represented by an arrow 366. For each candidate intra prediction mode the intra-frame prediction module 364 produces a block of samples, that is 366. The block of samples 366 is generated by the module 364 using techniques such as DC, planar or angular intra prediction.

The in-loop filters module 368 applies several filtering stages to the reconstructed samples 354. The filtering stages include a 'deblocking filter' (DBF) which applies smoothing aligned to the CU boundaries to reduce artefacts resulting from discontinuities. Another filtering stage present in the in-loop filters module 368 is an 'adaptive loop filter' (ALF), which applies a Wiener-based adaptive filter to further reduce distortion. A further available filtering stage in the in-loop filters module 368 is a 'sample adaptive offset' (SAO) filter. The SAO filter operates by firstly classifying reconstructed samples into one or multiple categories and, according to the allocated category, applying an offset at the sample level.

Filtered samples, represented by an arrow 370, are output from the in-loop filters module 368. The filtered samples 370 are stored in a frame buffer 372. The frame buffer 372 typically has the capacity to store several (for example up to 16) pictures and thus is stored in the memory 206. The frame buffer 372 is not typically stored using on-chip memory due to the large memory consumption required. As such, access to the frame buffer 372 is costly in terms of memory bandwidth. The frame buffer 372 provides reference frames (represented by an arrow 374) to a motion estimation module 376 and the motion compensation module 380.

The motion estimation module 376 estimates a number of 'motion vectors' (indicated as 378), each being a Cartesian spatial offset from the location of the present CB, referencing a block in one of the reference frames in the frame buffer 372. A filtered block of reference samples (represented as 382) is produced for each motion vector. The filtered reference samples 382 form further candidate modes available for potential selection by the mode selector 386. Moreover, for a given CU, the PU 320 may be formed using one reference block ('uni-predicted') or may be formed using two reference blocks ('bi-predicted'). For the selected motion vector, the motion compensation module 380 produces the PB 320 in accordance with a filtering process supportive of sub-pixel accuracy in the motion vectors. As such, the motion estimation module 376 (which operates on many candidate motion vectors) may perform a simplified filtering process compared to that of the motion compensation module 380 (which operates on the selected candidate only) to achieve reduced computational complexity. When the video encoder 114 selects inter prediction for a CU the motion vector 378 is encoded into the bitstream 115.

Although the video encoder 114 of FIG. 3 is described with reference to versatile video coding (VVC), other video coding standards or implementations may also employ the processing stages of modules 310-390. The frame data 113 (and bitstream 115) may also be read from (or written to) memory 206, the hard disk drive 210, a CD-ROM, a Blu-ray Disk™ or other computer readable storage medium. Additionally, the frame data 113 (and bitstream 115) may be received from (or transmitted to) an external source, such as a server connected to the communications network 220 or a radio-frequency receiver. The communications network 220 may provide limited bandwidth, necessitating the use of rate control in the video encoder 114 to avoid saturating the network at times when the frame data 113 is difficult to compress. Moreover, the bitstream 115 may be constructed from one or more slices, representing spatial sections (collections of CTUs) of the frame data 113, produced by one or more instances of the video encoder 114, operating in a co-ordinated manner under control of the processor 205. In the context of the present disclosure, a slice can also be referred to as a "contiguous portion" of the bitstream. Slices are contiguous within the bitstream and can be encoded or decoded as separate portions, for example if parallel processing is being used.

The video decoder 134 is shown in FIG. 4. Although the video decoder 134 of FIG. 4 is an example of a versatile video coding (VVC) video decoding pipeline, other video codecs may also be used to perform the processing stages described herein. As shown in FIG. 4, the bitstream 133 is input to the video decoder 134. The bitstream 133 may be read from memory 206, the hard disk drive 210, a CD-ROM, a Blu-ray Disk™ or other non-transitory computer readable storage medium. Alternatively, the bitstream 133 may be received from an external source such as a server connected to the communications network 220 or a radio-frequency receiver. The bitstream 133 contains encoded syntax elements representing the captured frame data to be decoded.

The bitstream 133 is input to an entropy decoder module 420. The entropy decoder module 420 extracts syntax elements from the bitstream 133 by decoding sequences of 'bins' and passes the values of the syntax elements to other modules in the video decoder 134. The entropy decoder module 420 uses variable-length and fixed length decoding to decode SPS, PPS or slice header an arithmetic decoding engine to decode syntax elements of the slice data as a sequence of one or more bins. Each bin may use one or more 'contexts', with a context describing probability levels to be used for coding a 'one' and a 'zero' value for the bin. Where multiple contexts are available for a given bin, a 'context modelling' or 'context selection' step is performed to choose one of the available contexts for decoding the bin. The process of decoding bins forms a sequential feedback loop, thus each slice may be decoded in the slice's entirety by a given entropy decoder 420 instance. A single (or few) high-performing entropy decoder 420 instances may decode all slices for a frame from the bitstream 115 multiple lower-performing entropy decoder 420 instances may concurrently decode the slices for a frame from the bitstream 133.

The entropy decoder module 420 applies an arithmetic coding algorithm, for example 'context adaptive binary arithmetic coding' (CABAC), to decode syntax elements from the bitstream 133. The decoded syntax elements are used to reconstruct parameters within the video decoder 134. Parameters include residual coefficients (represented by an arrow 424), a quantisation parameter 474, a secondary transform index 470, and mode selection information such as an intra prediction mode (represented by an arrow 458). The mode selection information also includes information such as motion vectors, and the partitioning of each CTU into one or more CBs. Parameters are used to generate PBs, typically in combination with sample data from previously decoded CBs.

The residual coefficients 424 are passed to an inverse secondary transform module 436 where either a secondary transform is applied or no operation is performed (bypass) according to a secondary transform index. The inverse secondary transform module 436 produces reconstructed transform coefficients 432, that is primary transform domain coefficients, from secondary transform domain coefficients. The reconstructed transform coefficients 432 are input to a dequantiser module 428. The dequantiser module 428 performs inverse quantisation (or 'scaling') on the residual coefficients 432, that is, in the primary transform coefficient domain, to create reconstructed intermediate transform coefficients, represented by an arrow 440, according to the quantisation parameter 474. The dequantiser module 428 may also apply a scaling matrix to provide non-uniform dequantization within the TB, corresponding to operation of the dequantiser module 340. Should use of a non-uniform inverse quantisation matrix be indicated in the bitstream 133, the video decoder 134 reads a quantisation matrix from the bitstream 133 as a sequence of scaling factors and arranges the scaling factors into a matrix. The inverse scaling uses the quantisation matrix in combination with the quantisation parameter to create the reconstructed intermediate transform coefficients 440.

The reconstructed transform coefficients 440 are passed to an inverse primary transform module 444. The module 444 transforms the coefficients 440 from the frequency domain back to the spatial domain. The inverse primary transform module 444 applies inverse DCT-2 transforms horizontally and vertically, constrained by the maximum available transform size as described with reference to the forward primary transform module 326. The result of operation of the module 444 is a block of residual samples, represented by an arrow 448. The block of residual samples 448 is equal in size to the corresponding CB. The residual samples 448 are supplied to a summation module 450. At the summation module 450 the residual samples 448 are added to a decoded PB (represented as 452) to produce a block of reconstructed samples, represented by an arrow 456. The reconstructed samples 456 are supplied to a reconstructed sample cache 460 and an in-loop filtering module 488. The in-loop filtering module 488 produces reconstructed blocks of frame samples, represented as 492. The frame samples 492 are written to a frame buffer 496.

The reconstructed sample cache 460 operates similarly to the reconstructed sample cache 356 of the video encoder 114. The reconstructed sample cache 460 provides storage for reconstructed sample needed to intra predict subsequent CBs without the memory 206 (for example by using the data 232 instead, which is typically on-chip memory). Reference samples, represented by an arrow 464, are obtained from the reconstructed sample cache 460 and supplied to a reference sample filter 468 to produce filtered reference samples indicated by arrow 472. The filtered reference samples 472 are supplied to an intra-frame prediction module 476. The module 476 produces a block of intra-predicted samples, represented by an arrow 480, in accordance with the intra prediction mode parameter 458 signalled in the bitstream 133 and decoded by the entropy decoder 420. The block of samples 480 is generated using modes such as DC, planar or angular intra prediction.

When the prediction mode of a CB is indicated to use intra prediction in the bitstream 133, the intra-predicted samples 480 form the decoded PB 452 via a multiplexor module 484. Intra prediction produces a prediction block (PB) of samples, that is, a block in one colour component, derived using 'neighbouring samples' in the same colour component. The neighbouring samples are samples adjacent to the current block and by virtue of being preceding in the block decoding order have already been reconstructed. Where luma and chroma blocks are collocated, the luma and chroma blocks may use different intra prediction modes. However, the two chroma CBs share the same intra prediction mode.

When the prediction mode of the CB is indicated to be inter prediction in the bitstream 133, a motion compensation module 434 produces a block of inter-predicted samples, represented as 438, using a motion vector (decoded from the bitstream 133 by the entropy decoder 420) and reference frame index to select and filter a block of samples 498 from a frame buffer 496. The block of samples 498 is obtained from a previously decoded frame stored in the frame buffer 496. For bi-prediction, two blocks of samples are produced and blended together to produce samples for the decoded PB 452. The frame buffer 496 is populated with filtered block data 492 from an in-loop filtering module 488. As with the in-loop filtering module 368 of the video encoder 114, the in-loop filtering module 488 applies any of the DBF, the ALF and SAO filtering operations. Generally, the motion vector is applied to both the luma and chroma channels, although the filtering processes for sub-sample interpolation in the luma and chroma channel are different.

Figure 5:
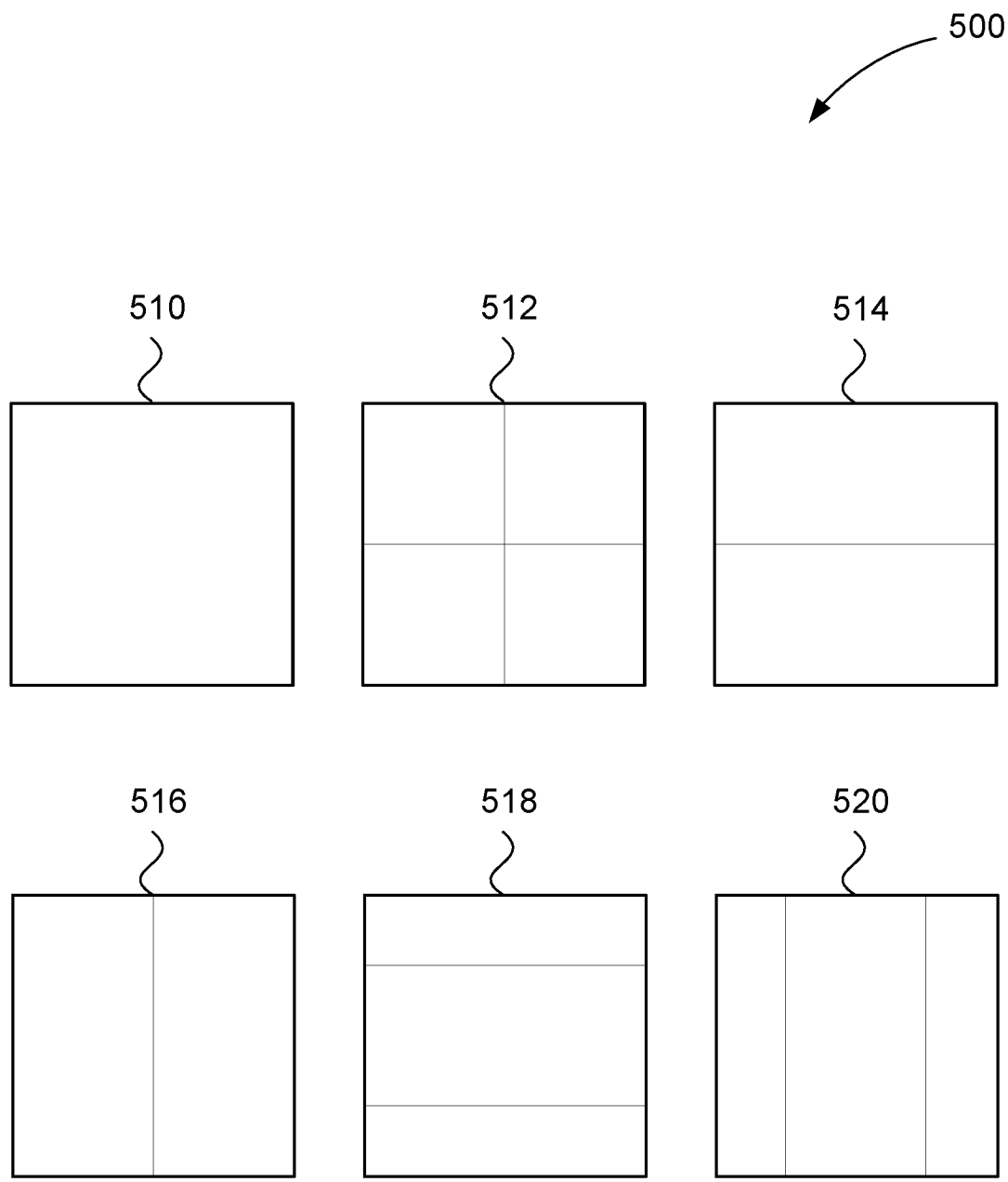
FIG. 5 is a schematic block diagram showing the available divisions of a block into one or more blocks in the tree structure of versatile video coding.

FIG. 5 is a schematic block diagram showing a collection 500 of available divisions or splits of a region into one or more sub-regions in the tree structure of versatile video coding. The divisions shown in the collection 500 are available to the block partitioner 310 of the encoder 114 to divide each CTU into one or more CUs or CBs according to a coding tree, as determined by the Lagrangian optimisation, as described with reference to FIG. 3.

Although the collection 500 shows only square regions being divided into other, possibly non-square sub-regions, it should be understood that the collection 500 is showing the potential divisions of a parent node in a coding tree into child nodes in the coding tree and not requiring the parent node to correspond to a square region. If the containing region is non-square, the dimensions of the blocks resulting from the division are scaled according to the aspect ratio of the containing block. Once a region is not further split, that is, at a leaf node of the coding tree, a CU occupies that region.

The process of subdividing regions into sub-regions must terminate when the resulting sub-regions reach a minimum CU size, generally 4×4 luma samples. In addition to constraining CUs to prohibit block areas smaller than a predetermined minimum size, for example 16 samples, CUs are constrained to have a minimum width or height of four. Other minimums, both in terms of width and height or in terms of width or height are also possible. The process of subdivision may also terminate prior to the deepest level of decomposition, resulting in a CUs larger than the minimum CU size. It is possible for no splitting to occur, resulting in a single CU occupying the entirety of the CTU. A single CU occupying the entirety of the CTU is the largest available coding unit size. Due to use of subsampled chroma formats, such as 4:2:0, arrangements of the video encoder 114 and the video decoder 134 may terminate splitting of regions in the chroma channels earlier than in the luma channels, including in the case of a shared coding tree defining the block structure of the luma and chroma channels. When separate coding trees are used for luma and chroma, constraints on available splitting operations ensure a minimum chroma CB area of 16 samples, even though such CBs are collocated with a larger luma area, e.g., 64 luma samples.

At the leaf nodes of the coding tree exist CUs, with no further subdivision. For example, a leaf node 510 contains one CU. At the non-leaf nodes of the coding tree exist a split into two or more further nodes, each of which could be a leaf node that forms one CU, or a non-leaf node containing further splits into smaller regions. At each leaf node of the coding tree, one coding block exists for each colour channel. Splitting terminating at the same depth for both luma and chroma results in three collocated CBs. Splitting terminating at a deeper depth for luma than for chroma results in a plurality of luma CBs being collocated with the CBs of the chroma channels.

A quad-tree split 512 divides the containing region into four equal-size regions as shown in FIG. 5. Compared to HEVC, versatile video coding (VVC) achieves additional flexibility with additional splits, including a horizontal binary split 514 and a vertical binary split 516. Each of the splits 514 and 516 divides the containing region into two equal-size regions. The division is either along a horizontal boundary (514) or a vertical boundary (516) within the containing block.

Further flexibility is achieved in versatile video coding with addition of a ternary horizontal split 518 and a ternary vertical split 520. The ternary splits 518 and 520 divide the block into three regions, bounded either horizontally (518) or vertically (520) along ¼ and ¾ of the containing region width or height. The combination of the quad tree, binary tree, and ternary tree is referred to as 'QTBTTT'. The root of the tree includes zero or more quadtree splits (the 'QT' section of the tree). Once the QT section terminates, zero or more binary or ternary splits may occur (the 'multi-tree' or 'MT' section of the tree), finally ending in CBs or CUs at leaf nodes of the tree. Where the tree describes all colour channels, the tree leaf nodes are CUs. Where the tree describes the luma channel or the chroma channels, the tree leaf nodes are CBs.

Compared to HEVC, which supports only the quad tree and thus only supports square blocks, the QTBTTT results in many more possible CU sizes, particularly considering possible recursive application of binary tree and/or ternary tree splits. When only quad-tree splitting is available, each increase in coding tree depth corresponds to a reduction in CU size to one quarter the size of the parent area. In VVC, the availability of binary and ternary splits means that the coding tree depth no longer corresponds directly to CU area. The potential for unusual (non-square) block sizes can be reduced by constraining split options to eliminate splits that would result in a block width or height either being less than four samples or in not being a multiple of four samples. Generally, the constraint would apply in considering luma samples. However, in the arrangements described, the constraint can be applied separately to the blocks for the chroma channels. Application of the constraint to split options to chroma channels can result in differing minimum block sizes for luma versus chroma, for example when the frame data is in the 4:2:0 chroma format or the 4:2:2 chroma format. Each split produces sub-regions with a side dimension either unchanged, halved or quartered, with respect to the containing region. Then, since the CTU size is a power of two, the side dimensions of all CUs are also powers of two.

Figure 6:
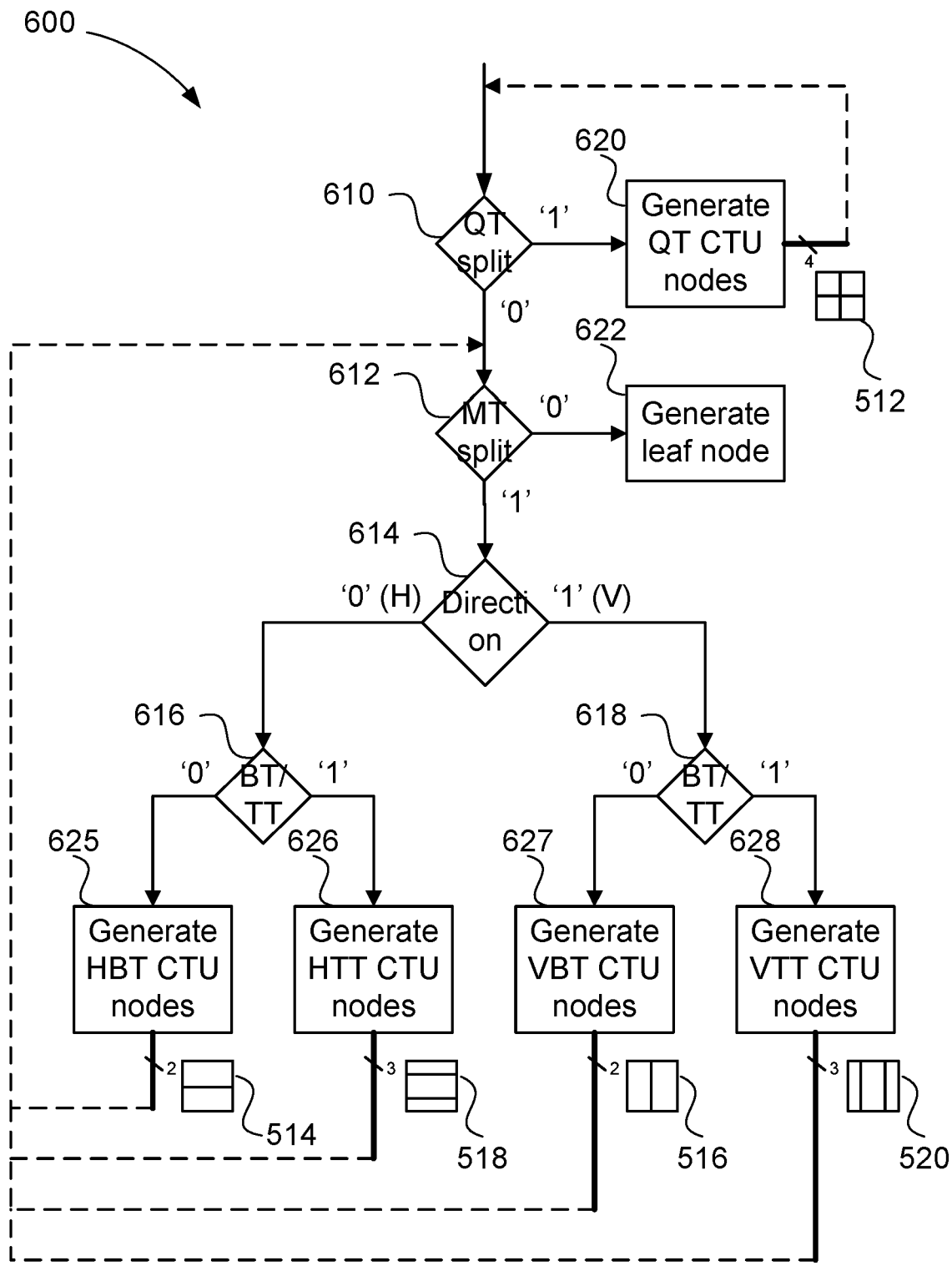
FIG. 6 is a schematic illustration of a dataflow to achieve permitted divisions of a block into one or more blocks in a tree structure of versatile video coding.

FIG. 6 is a schematic flow diagram illustrating a data flow 600 of a QTBTTT (or 'coding tree') structure used in versatile video coding. The QTBTTT structure is used for each CTU to define a division of the CTU into one or more CUs. The QTBTTT structure of each CTU is determined by the block partitioner 310 in the video encoder 114 and encoded into the bitstream 115 or decoded from the bitstream 133 by the entropy decoder 420 in the video decoder 134. The data flow 600 further characterises the permissible combinations available to the block partitioner 310 for dividing a CTU into one or more CUs, according to the divisions shown in FIG. 5.

Starting from the top level of the hierarchy, that is at the CTU, zero or more quad-tree divisions are first performed. Specifically, a Quad-tree (QT) split decision 610 is made by the block partitioner 310. The decision at 610 returning a '1' symbol indicates a decision to split the current node into four sub-nodes according to the quad-tree split 512. The result is the generation of four new nodes, such as at 620, and for each new node, recursing back to the QT split decision 610. Each new node is considered in raster (or Z-scan) order. Alternatively, if the QT split decision 610 indicates that no further split is to be performed (returns a '0' symbol), quad-tree partitioning ceases and multi-tree (MT) splits are subsequently considered.

Firstly, an MT split decision 612 is made by the block partitioner 310. At 612, a decision to perform an MT split is indicated. Returning a '0' symbol at decision 612 indicates that no further splitting of the node into sub-nodes is to be performed. If no further splitting of a node is to be performed, then the node is a leaf node of the coding tree and corresponds to a CU. The leaf node is output at 622. Alternatively, if the MT split 612 indicates a decision to perform an MT split (returns a '1' symbol), the block partitioner 310 proceeds to a direction decision 614.

The direction decision 614 indicates the direction of the MT split as either horizontal ('H' or '0') or vertical ('V' or '1'). The block partitioner 310 proceeds to a decision 616 if the decision 614 returns a '0' indicating a horizontal direction. The block partitioner 310 proceeds to a decision 618 if the decision 614 returns a '1' indicating a vertical direction.

At each of the decisions 616 and 618, the number of partitions for the MT split is indicated as either two (binary split or 'BT' node) or three (ternary split or 'TT') at the BT/TT split. That is, a BT/TT split decision 616 is made by the block partitioner 310 when the indicated direction from 614 is horizontal and a BT/TT split decision 618 is made by the block partitioner 310 when the indicated direction from 614 is vertical.

The BT/TT split decision 616 indicates whether the horizontal split is the binary split 514, indicated by returning a '0', or the ternary split 518, indicated by returning a '1'. When the BT/TT split decision 616 indicates a binary split, at a generate HBT CTU nodes step 625 two nodes are generated by the block partitioner 310, according to the binary horizontal split 514. When the BT/TT split 616 indicates a ternary split, at a generate HTT CTU nodes step 626 three nodes are generated by the block partitioner 310, according to the ternary horizontal split 518.

The BT/TT split decision 618 indicates whether the vertical split is the binary split 516, indicated by returning a '0', or the ternary split 520, indicated by returning a '1'. When the BT/TT split 618 indicates a binary split, at a generate VBT CTU nodes step 627 two nodes are generated by the block partitioner 310, according to the vertical binary split 516. When the BT/TT split 618 indicates a ternary split, at a generate VTT CTU nodes step 628 three nodes are generated by the block partitioner 310, according to the vertical ternary split 520. For each node resulting from steps 625-628 recursion of the data flow 600 back to the MT split decision 612 is applied, in a left-to-right or top-to-bottom order, depending on the direction 614. As a consequence, the binary tree and ternary tree splits may be applied to generate CUs having a variety of sizes.

Figure 7A:
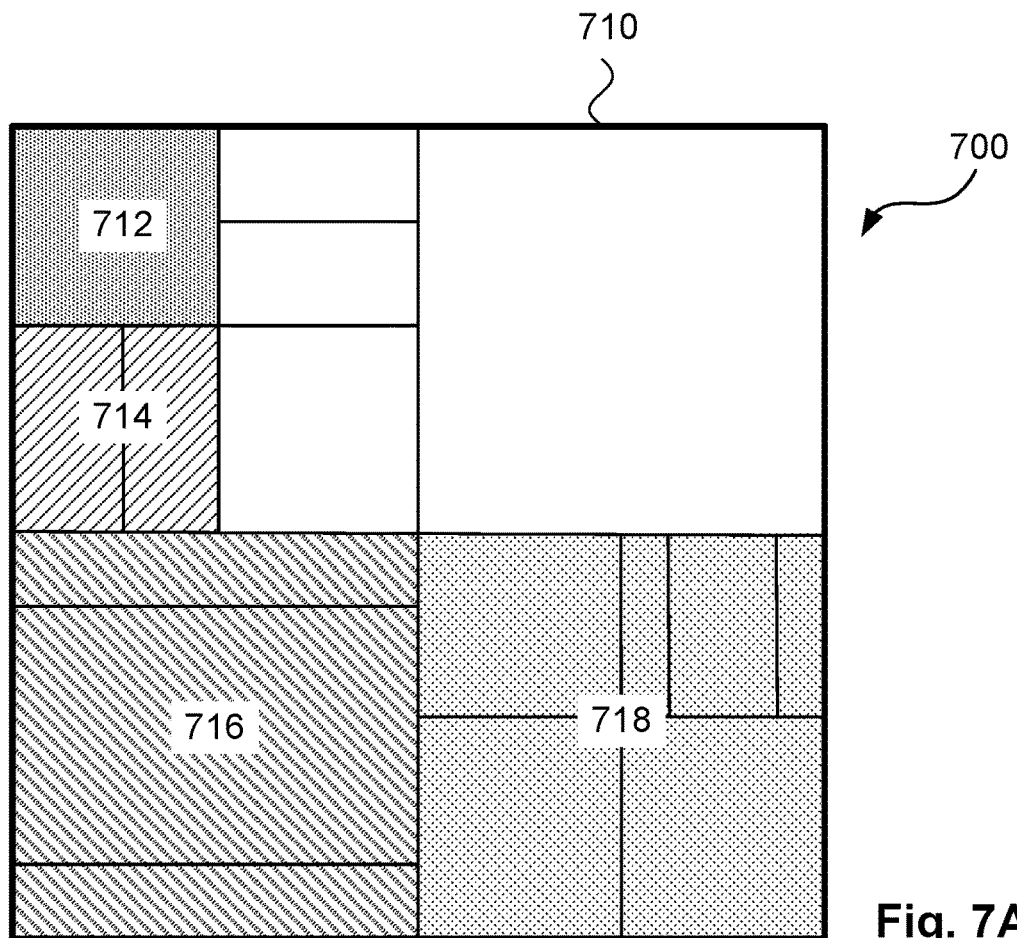
FIGS. 7A and 7B show an example division of a coding tree unit (CTU) into a number of coding units (CUs)
Figure 7B:
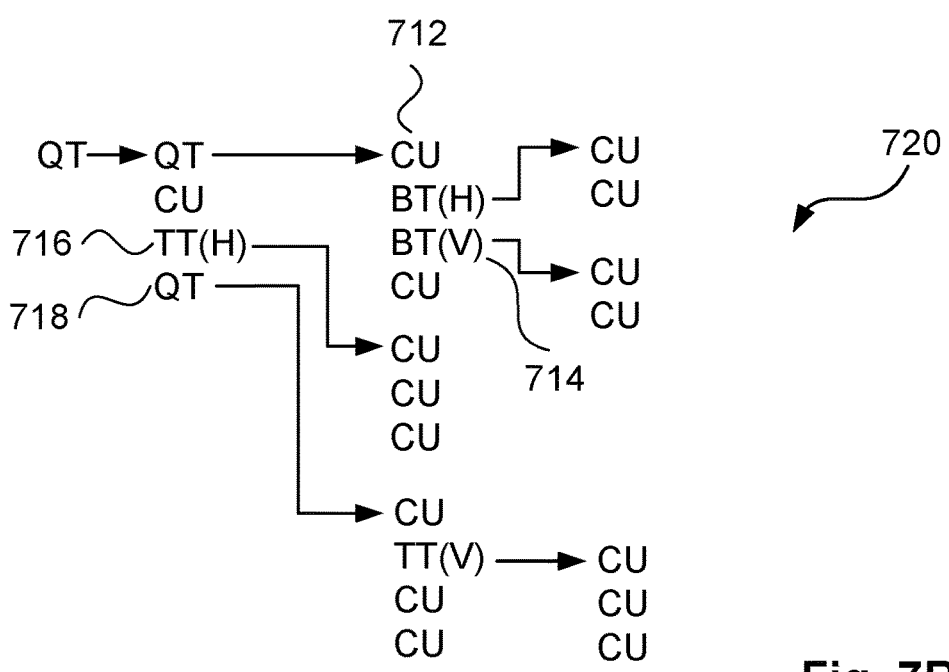

FIGS. 7A and 7B provide an example division 700 of a CTU 710 into a number of CUs or CBs. An example CU 712 is shown in FIG. 7A. FIG. 7A shows a spatial arrangement of CUs in the CTU 710. The example division 700 is also shown as a coding tree 720 in FIG. 7B.

At each non-leaf node in the CTU 710 of FIG. 7A, for example nodes 714, 716 and 718, the contained nodes (which may be further divided or may be CUs) are scanned or traversed in a 'Z-order' to create lists of nodes, represented as columns in the coding tree 720. For a quad-tree split, the Z-order scanning results in top left to right followed by bottom left to right order. For horizontal and vertical splits, the Z-order scanning (traversal) simplifies to a top-to-bottom scan and a left-to-right scan, respectively. The coding tree 720 of FIG. 7B lists all nodes and CUs according to the applied scan order. Each split generates a list of two, three or four new nodes at the next level of the tree until a leaf node (CU) is reached.

Having decomposed the image into CTUs and further into CUs by the block partitioner 310, and using the CUs to generate each residual block (324) as described with reference to FIG. 3, residual blocks are subject to forward transformation and quantisation by the video encoder 114. The resulting TBs 336 are subsequently scanned to form a sequential list of residual coefficients, as part of the operation of the entropy coding module 338. An equivalent process is performed in the video decoder 134 to obtain TBs from the bitstream 133.

Figure 8:
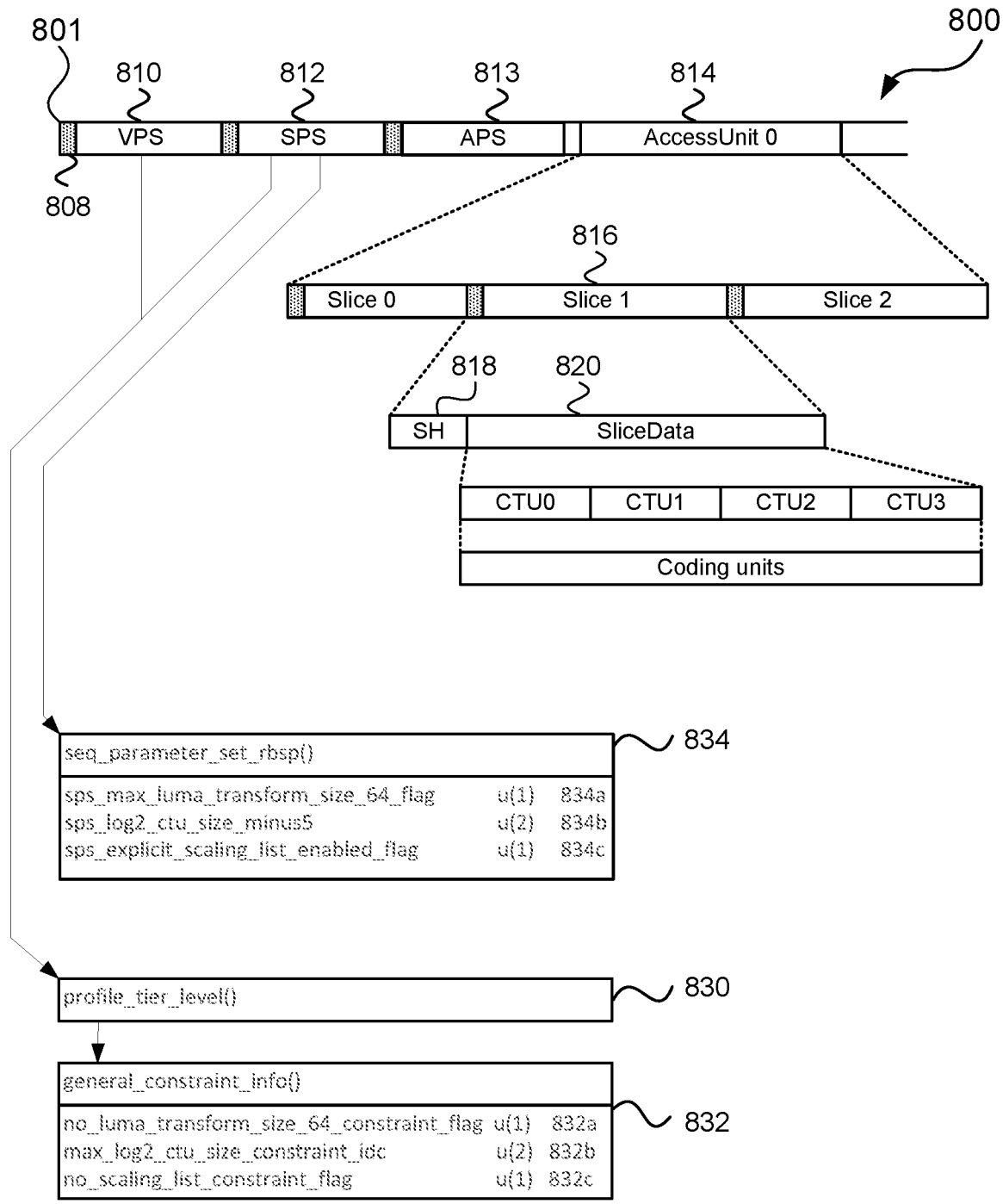
FIG. 8 shows a syntax structure for a bitstream with multiple slices, each of which includes multiple coding units.

FIG. 8 shows a syntax structure 800 for a bitstream 801 with one or more slices. Each of the slices includes multiple coding units. The bitstream 801 encodes the image frame data 113 and is divided into a plurality of coding tree units, each of the coding tree units being divided into one or more coding units, in turn divided into one or more transform blocks. The bitstream 801 may be produced by the video encoder 114, e.g. as the bitstream 115, or may be parsed by the video decoder 134, e.g. as the bitstream 133. The bitstream 801 is divided into portions, for example network abstraction layer (NAL) units, with delineation achieved by preceding each NAL unit with a NAL unit header such as 808. The NAL unit header includes a NAL unit type identifying the contents of the following NAL unit. A video parameter set (VPS) 810 has a NAL unit type named 'VPS NUT' and includes parameters applicable to all layers of the bitstream. The VPS 810 may include a profile_tier_level syntax structure 830. The structure 830 specifies a profile of the bitstream with a 'general_profile_idc' syntax element, and a general_constraint_info syntax structure 832, specifying a subprofile (if any) of the selected profile. The general_constraint_info syntax structure 832 includes a flag no_luma_transform_size_64_constraint_flag 832a and a codeword max_log 2_ctu_size_constraint_idc 832b. The flag 832a provides a maximum transform block size constraint (for example, 64) for the bitstream, providing a high-level (in the context of the structure of the bitstream) indication of tools required to encode or decode the bitstream. The 64-point transform differs from other transforms in the that only the first 32 residual coefficients are scanned and coded. For example, a 64×64 TB may only have significant (nonzero) residual coefficients in the upper-left 32×32 region. The flag 832a indicates the constraint that maximum primary transform size is restricted to 32 points horizontally and vertically, or left unconstrained, in which case the maximum primary transform size supported by the VVC standard is 64 points horizontally and vertically. The flag 832a is a fixed-length codeword or flag typically of size 1 bit. Additional constraining of the maximum transform size to a smaller value, such as 16 points or 8 points can also be implemented in a similar manner. Similarly, the codeword 832b provides a maximum CTU size constraint for the bitstream, providing a high-level indication of tools required to encode or decode the bitstream. The codeword 832b is a fixed-length codeword typically of size 2 bits. The structure 832 defines a particular subprofile associated with an implementation of the video encoder 114 and the video decoder 134. The syntax structure 832 includes a no_scaling_list_constraint_flag 832c. The flag 832c, when active (value equal to 1), indicates that scaling lists are not able to be used in the bitstream.

A sequence parameter set (SPS) 812 has a NAL unit type named 'SPS_NUT' and may also include the profile_tier_level syntax structure 830. The profile level tier syntax structure 830 is included either in the VPS 810 or the SPS 812 but not in both. The sequence parameter set (SPS) 812 defines sequence-level parameters, such as a profile (set of tools) used for encoding and decoding the bitstream, chroma format, sample bit depth, and frame resolution. The SPS 812 also specifies which coding tools may be used in a particular bitstream, the selection being a subset of the tools indicated as available by the profile and subprofile. A structure 834 shows an example of tools available by a subprofile. A flag sps_max_luma_transform_size_64_flag 834*a* indicates if a 64-pt primary transform may be used. The flag 834*a* may only indicate use of the 64-pt primary transform if the constraint flag 832*a* does not prohibit use of a 64-pt primary transform. A sps_log 2_ctu_size_minus5 codeword 834*b* indicates the size of the CTU (that is, the maximum coding unit size), using a two-bit fixed-length codeword. The codeword 834*b* may have values 0, 1, or 2, indicating a CTU size of 32×32, 64×64, or 128×128, respectively. The value 3 is reserved in the initial ("version 1") profiles of VVC. The codeword 834*b* may not exceed the value of 832*b* and thus 832*b* imposes a limit on the CTU size as part of the subprofile definition. A sps_explicit_scaling_list_enabled_flag 834*c* indicates if scaling lists are allowed to be used in the bitstream for non-uniform quantisation within a given TB. When the flag 832*c* is active (value equal to 1 for example), the flag 834*c* is required to be in the inactive state (value equal to 0).

The flag 834*a* indicates a maximum enabled transform block size for the bitstream. The flag 834*a* is constrained based on the corresponding constraint flag 832*a* but not conditioned (set) based on the constraint flag 832*a*. In a compliant bitstream, the maximum transform block size enabled by the flag 834*a* corresponds to the constraint set by the constraint flag 832*a*, for example having a maximum value less than or equal to the constraint flag 832*a*. The flag 834*a* is a fixed-length codeword or flag typically of size 1 bit.

Similarly, the codeword 834*b* indicates a maximum enabled CTU size for the bitstream. The codeword 834*b* is constrained based on the corresponding constraint codeword 832*b* but not conditioned (set) based on the constraint codeword 832*b*. In a compliant bitstream, the maximum CTU size enabled by the codeword 834*b* corresponds to the constraint set by the codeword 832*b*, for example having a maximum value less than or equal to the codeword 832*b*. The flag 834*b* is a fixed-length codeword typically of size 2 bits.

An adaptation parameter set (APS) 813 is coded either before a frame, using a NAL unit type named 'PREFIX_APS_NUT' or after a frame (not shown), using a NAL unit type named 'SUFFIX_APS_NUT'. Multiple APSs may be included between frames in the bitstream 800 (not shown). Each APS (for example 813) includes parameters for configuring one of three coding tools, being: scaling lists, ALF filter parameters, and LMCS model parameters. Which one of the three coding tools is configured in a given APS is specified by an "aps_params_type" codeword included in the respective APS. The aps_params_type codeword uses a three-bit fixed-length codeword, with values 0-2 for the three aforementioned tools and values 3-7 reserved for future use. Syntax element aps_params_type equal to 0 is named 'ALF_APS' and indicates the APS contains parameters for the adaptive loop filter, aps_params_type equal to 1 is named 'LMCS_APS' and indicates the APS contains parameters for the luma model chroma scaling tool, and aps_params_type equal to 2 is named 'SCALING_APS' and indicates the APS contains parameters for scaling lists.

A sequence of slices forming one picture is known as an access unit (AU), such as AU 0 814. The AU 0 814 includes three slices, such as slices 0 to 2. Slice 1 is marked as 816. As with other slices, slice 1 (816) includes a slice header 818 and slice data 820.

Figure 9:
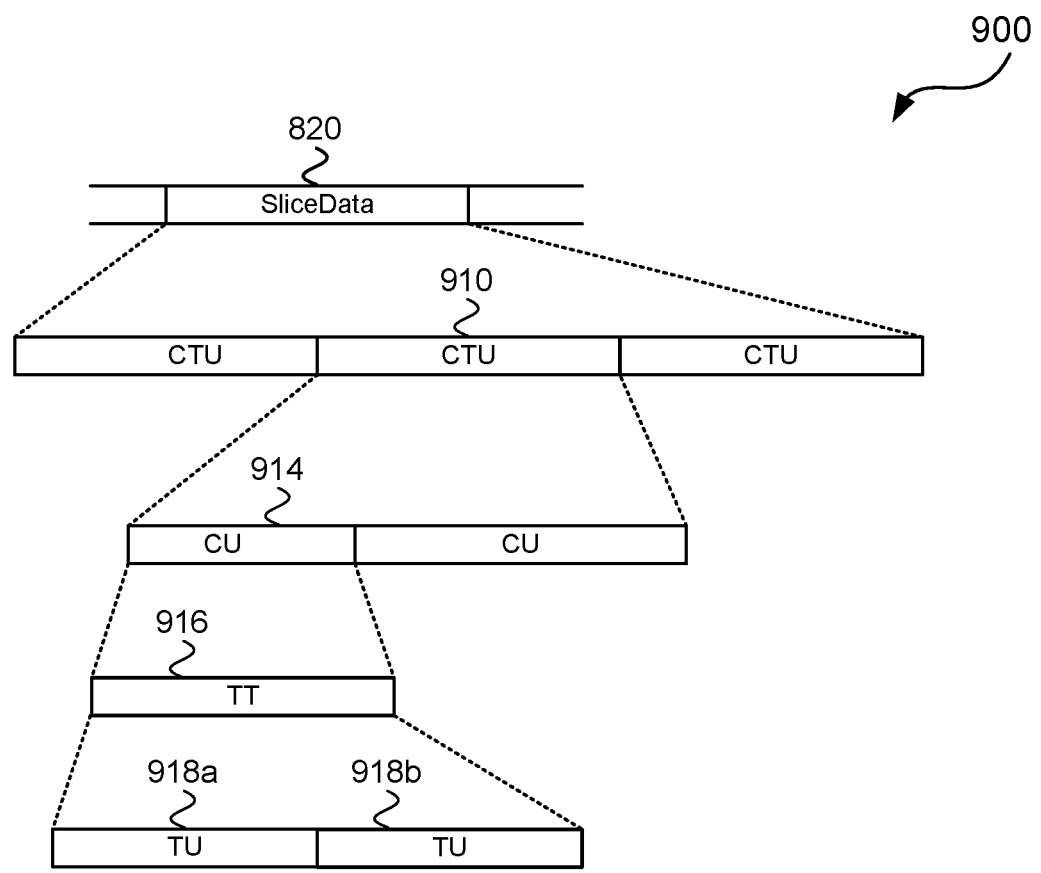
FIG. 9 shows a syntax structure for a bitstream with coding blocks of a coding tree unit.

FIG. 9 shows a syntax structure 900 for the slice data 820 of the bitstream 801 (e.g. 115 or 133). A CTU 910 includes one or more CUs, an example shown as a CU 914. The size of each CTU is set by the codeword 834*b*, the values of which are constrained by the constraint 832*b*. The CU 914 includes a signalled prediction mode (not shown) followed by a transform tree 916. If the size of the CU 914 does not exceed the maximum transform size (either 32-point or 64-point horizontally and vertically), the transform tree 916 includes one transform unit. If the size of a CU, for example the CU 914, does exceed the maximum transform size (either 32-point or 64-point horizontally and vertically), the transform tree 916 includes multiple TUs, arranged spatially in a tiled manner and stored sequentially in the bitstream, for example shown as TU 918*a* and 918*b*.

FIG. 10 shows a method 1000 for encoding the frame data 113 into the bitstream 115, the bitstream 115 including one or more slices as sequences of coding tree units. The method 1000 may be embodied by apparatus such as a configured FPGA, an ASIC, or an ASSP. Additionally, the method 1000 may be performed by the video encoder 114 under execution of the processor 205. Due to the workload of encoding a frame, steps of the method 1000 may be performed in different processors to share the workload, for example using contemporary multi-core processors, such that different slices are encoded by different processors. The generated bitstream 115 may conform to a subprofile that includes constraints on aspects of block structure, including maximum transform size and maximum CTU size. The method 1000 may be stored on computer-readable storage medium and/or in the memory 206.

The method 1000 begins at an encode constraint parameters step 1010. At step 1010 the video encoder 114 encodes the profile_tier_level syntax structure 830, which contains the general_constraint_info syntax structure 832 into either the VPS 810 or the SPS 812 in the bitstream 115 as a sequence of fixed length encoded parameters. Constraints on maximum transform size (832*a*) and maximum CTU size (832*b*) are encoded as part of the general_constraint_info syntax structure 832, contributing to the definition of the subprofile of the bitstream 115. A constraint on the usage of scaling lists is encoded as part of the general_constraint_info syntax structure 832 with a flag 832*c*, also contributing to the definition of the subprofile of the bitstream 115.

The method 1000 progresses from the step 1010 to an encode block structure parameters step 1015. At the step 1015 the video encoder 114 encodes the selected maximum transform size for the bitstream as a flag 834*a* into the SPS 812 and the selected CTU size for the bitstream 115 as a codeword 834*b* into the SPS 812. The flag 834*a* and the codeword 834*b* are encoded regardless of the value of the corresponding constraint flags, that is, 832*a* and 832*b*, respectively. However, the flag 834*a* and the codeword 834*b* are prohibited from indicating a higher capability (larger transform size or larger CTU size) than was constrained by the flag 832*a* and codeword 832*b*. At the step 1015 the video encoder 114 encodes the usage of scaling lists by encoding the flag 834*c*, encoding of the flag 834*c* occurring regardless of the value of the corresponding constraint flag 832*c*. However, the enablement flag 834*c* is constrained by the constraint flag 832*c* such that scaling lists may not be enabled by the flag 834*c* if their usage is prohibited by the constraint flag 832*c*.

The method 1000 continues from step 1015 to a divide frame into slices step 1020. In execution of step 1020 the processor 205 divides the frame data 113 into one or more slices or contiguous portions. Where parallelism is desired, separate instances of the video encoder 114 encode each slice somewhat independently. A single video encoder 114 may process each slice sequentially, or some intermediate degree of parallelism may be implemented. Generally, the division of a frame into slices (contiguous portions) is aligned to boundaries of divisions of the frame into regions known as 'sub-pictures' or tiles or the like.

The method 1000 continues from step 1020 to an encode slice header step 1030. At step 1030 the entropy encoder 338 encodes the slice header 818 into the bitstream 115.

The method 1000 continues from step 1030 to a divide slice into CTUs step 1040. In execution of step 1040 the video encoder 114 divides the slice 816 for example into a sequence of CTUs. Slice boundaries are aligned to CTU boundaries and CTUs in a slice are ordered according to a CTU scan order, typically a raster scan order. The division of a slice into CTUs establishes which portion of the frame data 113 is to be processed by the video encoder 113 in encoding the current slice.

The method 1000 continues from step 1040 to a determine coding tree step 1050. At step 1050 the video encoder 114 determines a coding tree for a current selected CTU in the slice. The method 1000 starts from the first CTU in the slice 816 on the first invocation of the step 1050 and progresses to subsequent CTUs in the slice 816 on subsequent invocations. In determining the coding tree of a CTU, a variety of combinations of quadtree, binary, and ternary splits are generated by the block partitioner 310 and tested.

The method 1000 continues from step 1050 to a determine coding unit step 1060. At step 1060 the video encoder 114 executes to determine encodings for the CUs resulting from various coding trees under evaluation using known methods. Determining encodings involves determining a prediction mode (e.g. intra prediction with specific mode or inter prediction with motion vector) and a transform selection (primary transform type and optional secondary transform type) based on coding cost for example. If the primary transform type for the luma TB is determined to be DCT-2 or any quantised primary transform coefficient that is not subject to forward secondary transformation is significant, the secondary transform index for the luma TB may indicate application of the secondary transform. Otherwise the secondary transform index for luma indicates bypassing of the secondary transform. For the luma channel, the primary transform type is determined to be DCT-2, transform skip, or one of the MTS options for the chroma channels, DCT-2 is the available transform type. In determining individual coding units the optimal coding tree is also determined, in a joint manner. When a coding unit is to be coded using intra prediction, a luma intra prediction mode and a chroma intra prediction are determined.

The method 1000 continues from step 1060 to an encode coding unit step 1070. At step 1070 the video encoder 114 encodes the determined coding unit of the step 1060 into the bitstream 115.

The method 1000 continues from step 1070 to a last coding unit test step 1080. At step 1080 the processor 205 tests if the current coding unit is the last coding unit in the CTU. If not ("NO" at step 1080), control in the processor 205 progresses to the determine coding unit step 1060. Otherwise, if the current coding unit is the last coding unit ("YES" at step 1080) control in the processor 205 progresses to a last CTU test step 1090.

At the last CTU test step 1090 the processor 205 tests if the current CTU is the last CTU in the slice 816. If not the last CTU in the slice 816 ("NO" at step 1090), control in the processor 205 returns to the determine coding tree step 1050. Otherwise, if the current CTU is the last ("YES" at step 1090), control in the processor 205 progresses to a last slice test step 10100.

At the last slice test step 10100 the processor 205 tests if the current slice being encoded is the last slice in the frame. If not the last slice ("NO" at step 10100), control in the processor 205 progresses to the encode slice header step 1030. Otherwise, if the current slice is the last and all slices (contiguous portions) have been encoded ("YES" at step 10100) the method 1000 terminates.

FIG. 11 shows a method 1100 for decoding a frame from a bitstream as sequences of coding units arranged into slices. The method 1100 may be embodied by apparatus such as a configured FPGA, an ASIC, or an ASSP. Additionally, the method 1100 may be performed by the video decoder 134 under execution of the processor 205. As such, the method 1100 may be stored on computer-readable storage medium and/or in the memory 206.

The method 1100 decodes a bitstream as encoded using the method 1000 in which the subprofile of the bitstream 115 includes constraints regarding block size, such as maximum transform size and maximum CTU size. The maximum transform size applies to luma and chroma, regardless of the chroma format of the video data. The CTU size indicates the area covered by the root node of a coding tree and root nodes of coding trees always apply to both luma and chroma channels, regardless of subsequent splitting into separate coding trees for luma and chroma that may occur deeper into the coding tree of a CTU.

The method 1100 begins at a decode constraint parameters step 1110. In execution of step 1110 the video decoder 134 decodes the general_constraint_info syntax structure 832 from either the VPS 810 or the SPS 812 present in the bitstream 133 as sequences of fixed length parameters to determine the subprofile of the bitstream 133. Constraints on maximum transform size (832a) and maximum CTU size (832b) are decoded as part of the general_constraint_info syntax structure 832, contributing to determining the subprofile of the bitstream 133. The step 1110 can decodes a maximum transform block size constraint and/or a maximum CTU size constraint from the bitstream for example. A constraint on the usage of scaling lists is decoded as part of the general_constraint_info syntax structure 832 with a flag 832c, also contributing to the definition of the subprofile of the bitstream 133.

The method 1100 progresses from the step 1110 to a decode block structure parameters step 1120. At the step 1120 the video decoder 134 decodes the selected maximum enabled transform size for the bitstream as a flag 834a from the SPS 812 and the selected maximum enabled CTU size for the bitstream 115 as a codeword 834b from the SPS 812. The flag 834a and the codeword 834b are decoded regardless of the corresponding constraint flags, that is, 832a and 832b, respectively. However, the flag 834a and the codeword 834b are prohibited (in a 'conforming' bitstream) from indicating a higher capability (larger transform size or larger CTU size) than was constrained by the flag 832a and codeword 832b. At the step 1125 the video decoder 134 decodes the usage of scaling lists by decoding the flag 834c, with decoding of the flag 834c occurring regardless of the value of the corresponding constraint flag 832c. However, the enablement flag 834c is constrained by the constraint flag 832c such that scaling lists may not be enabled by the flag 834c if their usage is prohibited by the constraint flag 832c. If a prohibition defined in the general_constraint_info syntax structure 832 is violated by the decoded block structure parameters the bitstream is deemed 'non-conforming' by the video decoder 134 and further decoding may cease.

The method 1100 continues from step 1120 to a decode slice header step 1130. At step 1130 the entropy decoder 420 decodes the slice header 818 from the bitstream 133.

The method 1100 continues from step 1130 to a divide slice into CTUs step 1140. At step 1140 the video decoder 134 divides the slice 816 into a sequence of CTUs. Slice boundaries are aligned to CTU boundaries and CTUs in a slice are ordered according to a CTU scan order. The CTU scan order is generally a raster scan order. The division of a slice into CTUs establishes which portion of the frame data 113 is to be processed by the video decoder 134 in decoding the current slice. The slice is divided into CTUs based on the maximum enabled CTU size decoded The method 1100 continues from step 1140 to a decode coding tree step 1150. In execution of step 1150 the video decoder 133 decodes a coding tree for a current CTU in the slice from the bitstream 133, starting from the first CTU in the slice 816 on the first invocation of the step 1150. The coding tree of a CTU is decoded by decoding split flags at the entropy decoder 420 in accordance with FIG. 6 and based on the maximum enabled CTU size. In subsequent iterations of the step 1150 for a CTU the decoding is performed for subsequent CTUs in the slice 816.

The method 1100 continues from step 1160 to a decode coding unit step 1170. At step 1170 the video decoder 134 decodes a coding unit from the bitstream 133. Each coding unit is decoded or determined from the corresponding CTU, the CTU being determined according to the decoded maximum enabled coding tree size and split flags decoded from the bitstream, The method 1100 continues from step 1110 to a last coding unit test step 1180. At step 1180 the processor 205 tests if the current coding unit is the last coding unit in the CTU. If not the last coding unit ("NO" at step 1180), control in the processor 205 returns to the decode coding unit step 1170 to decode a next coding unit of the coding tree unit. If the current coding unit is the last coding unit ("YES" at step 1180) control in the processor 205 progresses to a last CTU test step 1190.

At the last CTU test step 1190 the processor 205 tests if the current CTU is the last CTU in the slice 816. If not, the last CTU in the slice ("NO" at step 1190), control in the processor 205 returns to the decode coding tree step 1150 to decode the next coding tree unit of the slice 816. If the current CTU is the last CTU for the slice 816 ("YES" at step 1190) control in the processor 205 progresses to a last slice test step 11100.

At the last slice test step 11100 the processor 205 tests if the current slice being decoded is the last slice in the frame. If not the last slice in the frame ("NO" at step 11100), control in the processor 205 returns to the decode slice header step 1130 and the step 1130 operates to decode the slice header for the next slice (for example "Slice 2" of FIG. 11) in the frame. If the current slice is the last slice in the frame ("YES" at step 1100) the method 1100 terminates.

Steps 1140 to 11100 operate to decode the image frame by determining transform blocks for each of the coding units of the coding tree units according to the decoded maximum enabled transform block size and/or the decoded maximum enabled CTU size and split flags decoded from the bitstream. Operation of the method 1610 for a plurality of the coding units operates to produce an image frame, as described in relation to the device 130 at FIG. 1.

Arrangements of the video encoder 114 using the method 1000 and the video decoder 134 using the method 1100 are able to support subprofile definitions with a granularity that includes block structure aspects, namely: maximum transform size and CTU size (which corresponds to maximum CU size). Control of block structure aspects using a maximum transform size constraint and/or a maximum CTU size constraint means subprofiles provide granularity of control over block structure behaviour of the standard affecting all colour channels, irrespective of the chroma format used. Constraining maximum transform size and/or maximum CTU size using general constraints in association with a sequence-level set of tools allows early knowledge in decoding to determine which tools are needed. The constraint flags are located at fixed positions relative to the start of the VPS 810 or SPS 812 and thus the profile and subprofile of the bitstream can be determined without the need to perform variable-length decoding. Further, implementations or tools which are found to be problematic can be disabled without affecting other aspects of implementation, for example: other coding tools, and without generation of ad-hoc or non-standard subprofiles. Vendors implementing the VVC standard are accordingly afforded more flexibility in implementing video encoders and decoders suitable and adaptable for real-world applications and implementation in products.

In arrangement of the video encoder 114 and the video decoder 134 the maximum coding unit size is constrained using a one-bit flag that, when active, restricts the CTU size to 64×64 and when inactive allows a CTU size of 128×128.

In another arrangement of the video encoder 114 and the video decoder 134, a 'no_scaling_list_constraint_flag' (832c) is also present in the general_constraint_info( ) 832 and encoded by the video encoder 114 at the step 1010 and decoded by the video decoder 134 at the step 1110. The video encoder 114 encodes a sps_explicit_scaling_list_enabled_flag (834c) into the SPS 812, indicating whether scaling lists are to be used in quantisation/inverse quantisation or not. The video decoder 134 parses the sps_explicit_scaling_list_enabled_flag 834c from the SPS 812 to determine whether inverse quantisation should make use of scaling lists in the inverse quantisation performed by the inverse quantiser module 428. If the no_scaling_list_constraint_flag 832c is active (the value is equal to 1 for example) a sps_explicit_scaling_list_enabled_flag 834c coded in the SPS 812 indicates scaling lists are not in use (value equal to 0). If no_scaling_list_constraint_flag 832c indicates that scaling lists are not to be used (value equal to 1), aps_params_type is prohibited from having the value 2 ('SCALING_APS'). When a no_alf_constraint_flag, coded in the general_constraint_info( ) 832, indicates that the adaptive loop filter is not in use (value equal to 1) then aps_params_type of any APS associated with the bitstream (e.g. APS 813) is prohibited from having the value 0 ('ALF_APS'). When a no_lmcs_constraint_flag, coded in the general_constraint_info( ) 832, indicates that luma model chroma scaling is not to be used (value equal to 1) then aps_params_type of any APS associated with the bitstream (e,g, APS 813) is prohibited from having the value 1 ('LMCS_APS').

INDUSTRIAL APPLICABILITY

The arrangements described are applicable to the computer and data processing industries and particularly for the digital signal processing for the encoding a decoding of signals such as video and image signals, achieving high compression efficiency. Provision of one or more of the constraint flags described above allows selection of subsets of tools of a given profile ("subprofiling"). Selection of a subset of tools offers some benefit such as an implementation benefit of vendors of the VVC as the vendors are able to specify subsets of a profile that exclude an unnecessary or otherwise problematic coding tool, for example from a complexity standpoint.

The foregoing describes only some embodiments of the present invention, and modifications and/or changes can be made thereto without departing from the scope and spirit of the invention, the embodiments being illustrative and not restrictive.

APPENDIX A

An example of a working draft text for the VVC standard adapted to correspond to the methods described herein.

| 7.3.3.2 General constraint information syntax | |
|---|---|
| general_constraint_info( ) { | Descriptor |
| general_non_packed_constraint_flag | u(1) |
| general_frame_only_constraint_flag | u(1) |
| general_non_projected_constraint_flag | u(1) |
| general_one_picture_only_constraint_flag | u(1) |
| intra_only_constraint_flag | u(1) |
| max_bitdepth_constraint_idc | u(4) |
| max_chroma_format_constraint_idc | u(2) |
| single_layer_constraint_flag | u(1) |
| all_layers_independent_constraint_flag | u(1) |
| no_ref_pic_resampling_constraint_flag | u(1) |
| no_res_change_in_clvs_constraint_flag | u(1) |
| one_tile_per_pic_constraint_flag | u(1) |
| pic_header_in_slice_header_constraint_flag | u(1) |
| one_slice_per_pic_constraint_flag | u(1) |
| one_subpic_per_pic_constraint_flag | u(1) |
| max_log2_ctu_size_constraint_idc | u(2) |
| no_luma_transform_size_64_constraint_flag | u(1) |
| no_qtbtt_dual_tree_intra_constraint_flag | u(1) |
| no_partition_constraints_override_constraint_flag | u(1) |
| no_sao_constraint_flag | u(1) |
| no_alf_constraint_flag | u(1) |
| no_ccalf_constraint_flag | u(1) |
| no_joint_cbcr_constraint_flag | u(1) |
| no_mrl_constraint_flag | u(1) |
| no_isp_constraint_flag | u(1) |
| no_mip_constraint_flag | u(1) |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| no_sbt_constraint_flag | u(1) |
| no_lfnst_constraint_flag | u(1) |
| no_affine_motion_constraint_flag | u(1) |
| no_mmvd_constraint_flag | u(1) |
| no_smvd_constraint_flag | u(1) |
| no_prof_constraint_flag | u(1) |
| no_bcw_constraint_flag | u(1) |
| no_ibc_constraint_flag | u(1) |
| no_ciip_constraint_flag | u(1) |
| no_gpm_constraint_flag | u(1) |
| no_ladf_constraint_flag | u(1) |
| no_transform_skip_constraint_flag | u(1) |
| no_bdpcm_constraint_flag | u(1) |
| no_palette_constraint_flag | u(1) |
| no_act_constraint_flag | u(1) |
| no_lmcs_constraint_flag | u(1) |
| no_scaling_list_constraint_flag | u(1) |
| no_cu_qp_delta_constraint_flag | u(1) |
| no_chroma_qp_offset_constraint_flag | u(1) |

-continued

| 7.3.3.2 General constraint information syntax | |
|---|---|
| no_dep_quant_constraint_flag | u(1) |
| no_sign_data_hiding_constraint_flag | u(1) |
| no_tsrc_constraint_flag | u(1) |
| no_mixed_nalu_types_in_pic_constraint_flag | u(1) |
| no_trail_constraint_flag | u(1) |
| no_stsa_constraint_flag | u(1) |
| no_rasl_constraint_flag | u(1) |
| no_radl_constraint_flag | u(1) |
| no_idr_constraint_flag | u(1) |
| no_cra_constraint_flag | u(1) |
| no_gdr_constraint_flag | u(1) |
| no_aps_constraint_flag | u(1) |
| while( !byte_aligned( ) ) | |
|   gci_alignment_zero_bit | f(1) |
| gci_num_reserved_bytes | u(8) |
| for( i = 0; i < gci_num_reserved_bytes; i++ ) | |
|   gci_reserved_byte[ i ] | u(8) |
| } | |

7.4.4.2 General Constraint Information Semantics

. . .

max_log_2_ctu_size_constraint_idc specifies that sps_log 2_ctu_size_minus5 shall be in the range of 0 to max_log 2_ctu_size_constraint_idc, inclusive.

no_luma_transform_size_64_constraint_flag equal to 1 specifies that sps_max_luma_transform_size_64_flag shall be equal to 0.

no_luma_transform_size_64_constraint_flag equal to 0 does not impose such a constraint.

no_scaling_list_constraint_flag equal to 1 specifies that sps_explicit_scaling_list_enabled_flag shall be equal to 0 and aps_params_type shall not be equal to 2. no_scaling_list_constraint_flag equal to 0 does not impose such a constraint.

. . .

no_alf_constraint_flag equal to 1 specifies that sps_alf_enabled_flag shall be equal to 0. And aps_params_type shall not be equal to 0. no_alf_constraint_flag equal to 0 does not impose such constraints.

no_lmcs_constraint_flag equal to 1 specifies that sps_lmcs_enabled_flag shall be equal to 0 and aps_params_type shall not be equal to 0. no_lmcs_constraint_flag equal to 0 does not impose such constraints.

The invention claimed is:

1. A method of decoding an image frame from a bitstream, the image frame being divided into a plurality of coding tree units, each of the coding tree units being divided into one or more transform blocks, the method comprising:
  decoding a first flag for a maximum transform block size constraint from a general constraints information syntax structure included in a profile tier level syntax structure in the bitstream;
  decoding a second flag for a maximum transform block size from a sequence parameter set in the bitstream,
  wherein in a case where the maximum transform block size is not constrained by the first flag, i) the second flag is capable of indicating that the maximum transform block size is 64, and ii) the second flag is capable of being included in the sequence parameter set in the bitstream, and
  wherein in a case where the maximum transform block size is constrained by the first flag, i) the maximum transform block size is constrained to be 32, and ii) the second flag is capable of being included in the sequence parameter set in the bitstream;

determining the one or more transform blocks for each of the plurality of coding tree units according to the second flag for the maximum transform block size and split flags decoded from the bitstream;
decoding each of the determined one or more transform blocks from the bitstream to decode the image frame;
decoding first information for a coding tree unit size constraint from the general constraints information syntax structure included in the profile tier level syntax structure in the bitstream;
decoding second information indicating a value specifying the coding tree unit size from the sequence parameter set in the bitstream,
wherein the value is in a range of 0 to an integer value determined based on the first information,
determining one or more coding units for each of the plurality of coding tree units according to the second information for the coding tree unit size and split flags decoded from the bitstream;
decoding, from the bitstream, a third flag which indicates constraint on use of a scaling list, the third flag being included in the general constraints information syntax structure;
decoding, from the sequence parameter set in the bitstream, a fourth flag which indicates enablement of the scaling list, the fourth flag being constrained by the third flag, wherein the fourth flag is signalled regardless of a value of the third flag;
decoding one or more coding blocks from the bitstream with scaling performed according to a value of the fourth flag; and
decoding each of the determined the one or more coding units from the bitstream to decode the image frame.

2. The method according to claim 1, wherein a fixed-length codeword of 1 bit is used for the first flag for the maximum transform block size constraint.

3. The method according to claim 1, wherein a fixed-length codeword of 1 bit is used for the second flag for the maximum transform block size.

4. A video decoding apparatus for decoding an image frame from a bitstream, the image frame being divided into a plurality of coding tree units, each of the coding tree units being divided into one or more transform blocks, the video decoding apparatus comprising:
one or more controllers including one or more processors and one or more memories, which, when executed by the one or more processors, cause the one or more controllers to:
decode a first flag for a maximum transform block size constraint from a general constraints information syntax structure included in a profile tier level syntax structure in the bitstream;
decode a second flag for a maximum transform block size from a sequence parameter set in the bitstream,
wherein in a case where the maximum transform block size is not constrained by the first flag, i) the second flag is capable of indicating that the maximum transform block size is 64, and ii) the second flag is capable of being included in the sequence parameter set in the bitstream, and
wherein in a case where the maximum transform block size is constrained by the first flag, i) the maximum transform block size is constrained to be 32, and ii) the second flag is capable of being included in the sequence parameter set in the bitstream;
determine the one or more transform blocks for each of the plurality of coding tree units according to the second flag for the maximum transform block size and split flags decoded from the bitstream;
decode each of the determined one or more transform blocks from the bitstream to decode the image frame;
decode first information for a coding tree unit size constraint from the general constraints information syntax structure included in the profile tier level syntax structure in the bitstream;
decode second information indicating a value specifying the coding tree unit size from the sequence parameter set in the bitstream,
wherein the value is in a range of 0 to an integer value determined based on the first information,
determine one or more coding units for each of the plurality of coding tree units according to the second information for the coding tree unit size and split flags decoded from the bitstream;
decode, from the bitstream, a third flag which indicates constraint on use of a scaling list, the third flag being included in the general constraints information syntax structure;
decode, from the sequence parameter set in the bitstream, a fourth flag indicates enablement of the scaling list, the fourth flag being constrained by the third flag,
wherein the fourth flag is signaled regardless of a value of the third flag;
decode one or more coding blocks from the bitstream with scaling performed according to a value of the fourth flag; and
decode each of the determined the one or more coding units from the bitstream to decode the image frame.

5. A method of encoding an image frame into a bitstream, the image frame being divided into a plurality of coding tree units, each of the coding tree units being divided into one or more transform blocks, the method comprising:
encoding, into a general constraints information syntax structure included in a profile tier level syntax structure in the bitstream, a first flag for a maximum transform block size constraint;
encoding, into a sequence parameter set in the bitstream, a second flag for a maximum transform block size,
wherein in a case where the maximum transform block size is not constrained by the first flag, i) the second flag is capable of indicating that the maximum transform block size is 64, and ii) the second flag is capable of being included in the sequence parameter set in the bitstream, and
wherein in a case where the maximum transform block size is constrained by the first flag, i) the maximum transform block size is constrained to be 32, and ii) the second flag is capable of being included in the sequence parameter set in the bitstream;
encoding, into the bitstream, each of the one or more transform blocks;
encoding, into the general constraints information syntax structure included in the profile tier level syntax structure in the bitstream, first information for a coding tree unit size constraint;
encoding, into the sequence parameter set in the bitstream, second information indicating a value specifying the coding tree unit size,
wherein the value is in a range of 0 to an integer value determined based on the first information,
encoding, into the general constraints information syntax structure in the bitstream, a third flag which indicates constraint on use of a scaling list;

encoding, into the sequence parameter set in the bitstream, a fourth flag which indicates enablement of the scaling list, the fourth flag being constrained by the third flag, wherein the fourth flag is signalled regardless of a value of the third flag;

encoding one or more coding blocks into the bitstream with scaling performed according to a value of the fourth flag; and encoding each of the one or more coding blocks.

6. The method according to claim 5, wherein a fixed-length codeword of 1 bit is used for the first flag for the maximum transform block size constraint.

7. The method according to claim 5, wherein a fixed-length codeword of 1 bit is used for the second flag for the maximum transform block size.

* * * * *